(12) United States Patent
Ohno

(10) Patent No.: US 7,321,469 B2
(45) Date of Patent: Jan. 22, 2008

(54) ZOOM LENS

(75) Inventor: Kazunori Ohno, Saitama (JP)

(73) Assignee: Fujinon Corporation, Tokyo (JP)

( * ) Notice: Subject to any disclaimer, the term of this patent is extended or adjusted under 35 U.S.C. 154(b) by 0 days.

(21) Appl. No.: 11/598,695

(22) Filed: Nov. 14, 2006

(65) Prior Publication Data

US 2007/0109662 A1 May 17, 2007

(30) Foreign Application Priority Data

Nov. 14, 2005 (JP) ............................ P2005-328566
Dec. 19, 2005 (JP) ............................ P2005-364891

(51) Int. Cl.
*G02B 15/14* (2006.01)

(52) U.S. Cl. ...................... 359/682; 359/686; 359/753; 359/781

(58) Field of Classification Search ................ 359/676, 359/680, 682, 686, 753–756, 761–763, 770, 359/771, 781
See application file for complete search history.

(56) References Cited

U.S. PATENT DOCUMENTS

2005/0128601 A1* 6/2005 Minakata .................... 359/680
2006/0072211 A1* 4/2006 Imamura ..................... 359/686

FOREIGN PATENT DOCUMENTS

| JP | 9-211547 A | 8/1997 |
| JP | 2003-177315 A | 6/2003 |
| JP | 2005-4020 A | 1/2005 |

\* cited by examiner

*Primary Examiner*—Scott J. Sugarman
*Assistant Examiner*—Darryl J. Collins
(74) *Attorney, Agent, or Firm*—Birch, Stewart, Kolasch & Birch, LLP

(57) ABSTRACT

A zoom lens is provided and has: a first lens of a negative lens; a second lens of a positive lens; an aperture stop; a third lens of a negative lens; and a fourth lens of a positive lens in this order from an object side of the zoom lens. A zooming operation of the zoom lens is performed by varying mutual distances among the first to fourth lenses, and the zoom lens satisfies specific conditional expressions.

10 Claims, 22 Drawing Sheets

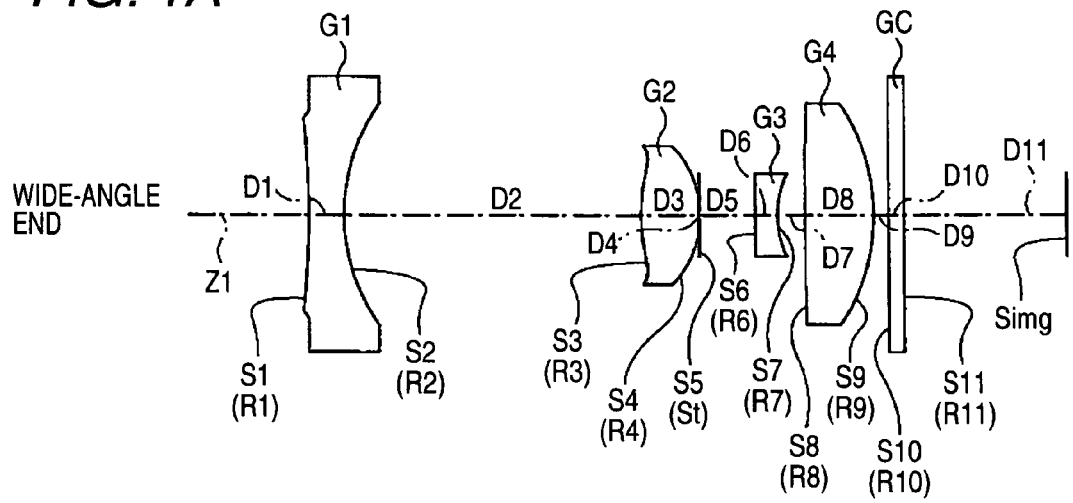
FIG. 1A WIDE-ANGLE END
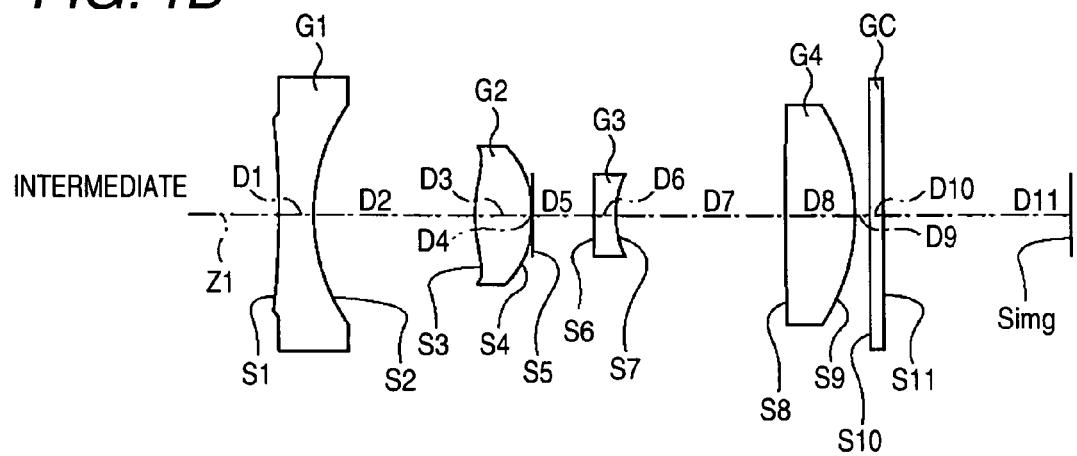
FIG. 1B INTERMEDIATE
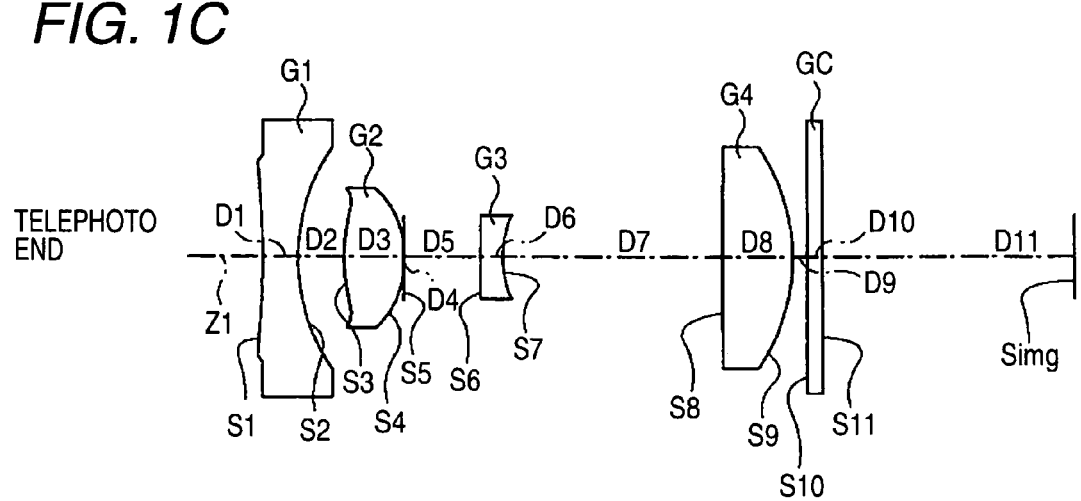
FIG. 1C TELEPHOTO END

FIG. 7

| | Si (SURFACE NUMBER) | Ri (CURVATURE RADIUS) | Di (SURFACE-TO-SURFACE DISTANCE) | Ndj (REFRACTIVE INDEX) | νdj (ABBE NUMBER) |
|---|---|---|---|---|---|
| | \multicolumn{5}{c}{FUNDAMENTAL LENS DATA OF EXAMPLE 1} |
| G1 | *1 | 76969.3594 | 1.20000 | 1.490231 | 57.6 |
| | *2 | 6.0462 | D2(VARIABLE) | | |
| G2 | *3 | 5.4670 | 2.00000 | 1.490231 | 57.6 |
| | *4 | -4.7955 | 0.00000 | | |
| | 5 | (STOP) | D5(VARIABLE) | | |
| G3 | *6 | -357.7167 | 0.75000 | 1.629995 | 24.0 |
| | *7 | 3.7510 | D7(VARIABLE) | | |
| G4 | 8 | 140.3962 | 2.40000 | 1.522492 | 59.8 |
| | 9 | -7.5993 | 0.53000 | | |
| GC | 10 | 0.0000 | 0.50000 | 1.516330 | 64.1 |
| | 11 | 0.0000 | D11(VARIABLE) | | |

(*ASPHERIC)

FIG. 8

| | Si (SURFACE NUMBER) | Ri (CURVATURE RADIUS) | Di (SURFACE-TO-SURFACE DISTANCE) | Ndj (REFRACTIVE INDEX) | νdj (ABBE NUMBER) |
|---|---|---|---|---|---|
| | \multicolumn{5}{c}{FUNDAMENTAL LENS DATA OF EXAMPLE 2} |
| G1 | *1 | -3840.2840 | 1.30000 | 1.490231 | 57.6 |
| | *2 | 7.9772 | D2(VARIABLE) | | |
| G2 | *3 | 5.5175 | 2.00000 | 1.490231 | 57.6 |
| | *4 | -5.9794 | 0.00000 | | |
| | 5 | (STOP) | D5(VARIABLE) | | |
| G3 | *6 | 120.8881 | 0.75000 | 1.629995 | 24.0 |
| | *7 | 3.3907 | D7(VARIABLE) | | |
| G4 | 8 | 16.7991 | 2.40000 | 1.757000 | 47.8 |
| | 9 | -18.6145 | 0.53000 | | |
| GC | 10 | 0.0000 | 0.50000 | 1.516800 | 64.2 |
| | 11 | 0.0000 | D11 | | |

(*ASPHERIC)

FIG. 9

| | FUNDAMENTAL LENS DATA OF EXAMPLE 3 | | | | |
|---|---|---|---|---|---|
| | Si (SURFACE NUMBER) | Ri (CURVATURE RADIUS) | Di (SURFACE-TO-SURFACE DISTANCE) | Ndj (REFRACTIVE INDEX) | $\nu dj$ (ABBE NUMBER) |
| G1 | *1 | -1386.8601 | 1.20000 | 1.490231 | 57.6 |
| | *2 | 5.1375 | D2(VARIABLE) | | |
| G2 | *3 | 5.0657 | 2.00000 | 1.490231 | 57.6 |
| | *4 | -5.0104 | 0.00000 | | |
| | 5 | (STOP) | D5(VARIABLE) | | |
| G3 | 6 | 16.9247 | 0.75000 | 1.846656 | 23.8 |
| | 7 | 3.4414 | D7(VARIABLE) | | |
| G4 | *8 | 11.2075 | 2.40000 | 1.487490 | 70.2 |
| | 9 | -11.1324 | 0.53000 | | |
| GC | 10 | 0.0000 | 0.50000 | 1.516800 | 64.2 |
| | 11 | 0.0000 | D11(VARIABLE) | | |

(*ASPHERIC)

FIG. 10

| | FUNDAMENTAL LENS DATA OF EXAMPLE 4 | | | | |
|---|---|---|---|---|---|
| | Si (SURFACE NUMBER) | Ri (CURVATURE RADIUS) | Di (SURFACE-TO-SURFACE DISTANCE) | Ndj (REFRACTIVE INDEX) | $\nu dj$ (ABBE NUMBER) |
| G1 | *1 | -779.2151 | 7.00000 | 1.490231 | 57.6 |
| | *2 | 7.0569 | D2(VARIABLE) | | |
| G2 | *3 | 5.1202 | 2.00000 | 1.490231 | 57.6 |
| | *4 | -4.6281 | 0.00000 | | |
| | 5 | (STOP) | D5(VARIABLE) | | |
| G3 | *6 | -21.2907 | 0.75000 | 1.630000 | 24.0 |
| | *7 | 3.9411 | D7(VARIABLE) | | |
| G4 | 8 | -66.4768 | 2.40000 | 1.696800 | 55.5 |
| | 9 | -7.8446 | 0.53000 | | |
| GC | 10 | 0.0000 | 0.50000 | 1.516800 | 64.2 |
| | 11 | 0.0000 | D11(VARIABLE) | | |

(*ASPHERIC)

FIG. 11

| ASPHERIC DATA OF EXAMPLE 1 | | | |
|---|---|---|---|
| ASPHERIC COEFFICIENT | SURFACE NUMBER | | |
| | 1ST SURFACE | 2ND SURFACE | 3RD SURFACE |
| $C$ | 1.299218E-5 | 0.165393 | 0.182916 |
| $K$ | 4.47635E8 | -1.1251952 | -3.3987105 |
| $A_3$ | -5.9019706E-04 | -6.0147233E-04 | — |
| $A_4$ | -2.6104580E-03 | -2.3705355E-03 | -6.0819998E-04 |
| $A_5$ | -3.8037914E-06 | -6.0607401E-05 | — |
| $A_6$ | 1.8368730E-04 | 2.3472200E-04 | -9.9213917E-04 |
| $A_7$ | -2.6310677E-07 | 5.6890003E-08 | — |
| $A_8$ | -5.1116623E-06 | -3.1464201E-06 | 1.5085034E-04 |
| $A_9$ | 2.7521724E-08 | -2.0477100E-07 | — |
| $A_{10}$ | 4.6573704E-08 | -2.3054775E-08 | -3.9615073E-05 |
| $A_{11}$ | — | — | — |
| $A_{12}$ | — | — | — |
| $A_{14}$ | — | — | — |
| | 4TH SURFACE | 6TH SURFACE | 7TH SURFACE |
| $C$ | -0.208529 | -2.795508E-3 | 0.266596 |
| $K$ | -2.6098079 | -5.255568E5 | 1.2175447 |
| $A_3$ | — | — | — |
| $A_4$ | -4.3548070E-03 | 9.0314789E-04 | 8.4253562E-04 |
| $A_5$ | — | — | — |
| $A_6$ | -4.5575242E-04 | -5.8370867E-04 | -1.0959634E-03 |
| $A_7$ | — | — | — |
| $A_8$ | 1.3456631E-05 | 8.5308691E-06 | 2.4616079E-04 |
| $A_9$ | — | — | — |
| $A_{10}$ | -1.0682328E-05 | 1.7662308E-05 | -1.3096299E-05 |
| $A_{11}$ | — | — | — |
| $A_{12}$ | — | -1.5431305E-06 | -5.8227855E-06 |
| $A_{14}$ | — | -1.5034398E-08 | 1.1938752E-09 |

FIG. 12

| ASPHERIC DATA OF EXAMPLE 2 | | | |
|---|---|---|---|
| ASPHERIC COEFFICIENT | SURFACE NUMBER | | |
| | 1ST SURFACE | 2ND SURFACE | 3RD SURFACE |
| C | -2.603974E-4 | 0.125357 | 0.1812415 |
| K | -9.70435E13 | 3.138187 | -0.4183764 |
| $A_4$ | -1.471805E-03 | -2.521284E-03 | -1.152604E-03 |
| $A_6$ | 1.149358E-04 | 1.539141E-04 | -1.452915E-04 |
| $A_8$ | -3.853122E-06 | -5.346991E-06 | -2.598205E-05 |
| $A_{10}$ | 5.658130E-08 | -7.983212E-10 | -7.969734E-07 |
| $A_{12}$ | — | — | — |
| $A_{14}$ | — | — | — |
| | 4TH SURFACE | 6TH SURFACE | 7TH SURFACE |
| C | -0.167241 | 8.272113E-3 | 0.294924 |
| K | -5.971803 | 1.0000 | -2.068429 |
| $A_4$ | -3.323497E-03 | -3.529139E-03 | 2.67067E-03 |
| $A_6$ | -1.003109E-04 | -2.055182E-04 | -5.53837E-04 |
| $A_8$ | 1.507300E-05 | -2.040088E-04 | -1.42631E-04 |
| $A_{10}$ | -6.156791E-06 | 5.070771E-05 | 4.01902E-05 |
| $A_{12}$ | — | 5.127954E-06 | 6.25491E-06 |
| $A_{14}$ | — | — | 2.00887E-08 |

FIG. 13

| ASPHERIC DATA OF EXAMPLE 3 | | | |
|---|---|---|---|
| ASPHERIC COEFFICIENT | SURFACE NUMBER | | |
| | 1ST SURFACE | 2ND SURFACE | 3RD SURFACE |
| C | −7.21053E−4 | 0.1946472 | 0.1974061 |
| K | −9.5781E13 | −0.1279718 | −3.0496097 |
| $A_4$ | −1.426986E−03 | −1.455213E−03 | −8.917868E−04 |
| $A_6$ | 1.040056E−04 | 1.144125E−04 | −1.008011E−03 |
| $A_8$ | −2.744570E−06 | −4.965703E−07 | 1.298408E−04 |
| $A_{10}$ | 4.107439E−08 | 1.560955E−07 | −4.060564E−05 |
| | 4TH SURFACE | 8TH SURFACE | |
| C | −0.1995849 | 0.0892260 | |
| K | −1.9678162 | −14.429943 | |
| $A_4$ | −4.403752E−03 | 1.355113E−03 | |
| $A_6$ | −4.432928E−04 | −4.610387E−05 | |
| $A_8$ | −1.965030E−05 | 1.002244E−06 | |
| $A_{10}$ | −6.954543E−06 | −1.076855E−08 | |

FIG. 14

| ASPHERIC DATA OF EXAMPLE 4 | | | |
|---|---|---|---|
| ASPHERIC COEFFICIENT | SURFACE NUMBER | | |
| | 1ST SURFACE | 2ND SURFACE | 3RD SURFACE |
| C | −1.283343E−3 | 0.141705 | 0.195305 |
| K | −9.74991E13 | −0.1014663 | −3.4200968 |
| $A_4$ | −2.747282E−04 | −6.301665E−04 | −9.839598E−04 |
| $A_6$ | 3.547552E−06 | 3.328881E−06 | −6.455113E−04 |
| $A_8$ | 4.770705E−08 | 2.518248E−06 | −4.115349E−05 |
| $A_{10}$ | −8.500749E−10 | −6.695503E−08 | −1.500255E−05 |
| $A_{12}$ | — | — | — |
| $A_{14}$ | — | — | — |
| $A_{16}$ | — | — | — |
| | 4TH SURFACE | 6TH SURFACE | 7TH SURFACE |
| C | −0.21607 | −0.015043 | 0.253736 |
| K | −2.6398882 | −532.7812 | 0.7364431 |
| $A_4$ | −4.270727E−03 | 5.326523E−03 | 1.318922E−02 |
| $A_6$ | −7.100696E−04 | 4.529329E−04 | −1.310560E−03 |
| $A_8$ | 6.386533E−05 | −9.342766E−04 | −7.527457E−04 |
| $A_{10}$ | −1.463069E−05 | 2.309987E−04 | 3.942919E−04 |
| $A_{12}$ | — | −2.839932E−06 | −4.708975E−05 |
| $A_{14}$ | — | −5.561032E−08 | −1.190572E−08 |
| $A_{16}$ | — | −2.041559E−12 | −2.041559E−12 |

FIG. 15

| OTHER DATA OF EXAMPLE 1 | | | |
|---|---|---|---|
| SURFACE-TO-SURFACE DISTANCE | WIDE-ANGLE END | INTERMEDIATE | TELEPHOTO END |
| D2 | 10.17578 | 1.96515 | 0.93600 |
| D5 | 5.50414 | 2.11824 | 5.88554 |
| D7 | 1.62914 | 2.66604 | 7.64687 |
| D11 | 5.65273 | 6.48726 | 8.80175 |
| FOCAL LENGTH OF TOTAL SYSTEM | 7.22475 | 12.17055 | 18.11345 |
| BACK-FOCAL DISTANCE (ON AIR BASIS) | 6.51237 | 7.34690 | 9.66140 |
| FNO. | 3.57 | 4.76 | 5.61 |
| VIEW ANGLE 2ω | 51.61° | 31.10° | 21.14° |

FIG. 16

| OTHER DATA OF EXAMPLE 2 | | | |
|---|---|---|---|
| SURFACE-TO-SURFACE DISTANCE | WIDE-ANGLE END | INTERMEDIATE | TELEPHOTO END |
| D2 | 14.6742 | 5.6809 | 1.6370 |
| D5 | 1.7475 | 2.5229 | 3.2523 |
| D7 | 1.1717 | 4.9375 | 7.430 |
| D11 | 7.0717 | 7.0717 | 7.0716 |
| FOCAL LENGTH OF TOTAL SYSTEM | 7.6028 | 13.0413 | 18.3322 |
| BACK-FOCAL DISTANCE (ON AIR BASIS) | 7.9313 | 7.9314 | 7.9313 |
| FNO. | 3.80 | 4.60 | 5.32 |
| VIEW ANGLE 2ω | 50.02° | 29.02° | 20.72° |

FIG. 17

| OTHER DATA OF EXAMPLE 3 | | | |
|---|---|---|---|
| SURFACE-TO-SURFACE DISTANCE | WIDE-ANGLE END | INTERMEDIATE | TELEPHOTO END |
| D2 | 10.5943 | 5.5120 | 1.6370 |
| D5 | 1.8267 | 2.1193 | 3.5565 |
| D7 | 0.9360 | 5.7257 | 8.1635 |
| D11 | 6.0365 | 8.1740 | 8.0874 |
| FOCAL LENGTH OF TOTAL SYSTEM | 6.8343 | 11.6129 | 18.4182 |
| BACK-FOCAL DISTANCE (ON AIR BASIS) | 6.8961 | 9.0337 | 8.9471 |
| FNO. | 3.73 | 4.85 | 5.89 |
| VIEW ANGLE 2ω | 52.45° | 33.23° | 21.80° |

FIG. 18

| OTHER DATA OF EXAMPLE 4 | | | |
|---|---|---|---|
| SURFACE-TO-SURFACE DISTANCE | WIDE-ANGLE END | INTERMEDIATE | TELEPHOTO END |
| D2 | 11.12695 | 5.51198 | 1.63698 |
| D5 | 1.80044 | 1.98664 | 2.30750 |
| D7 | 0.93600 | 6.32396 | 8.25528 |
| D11 | 5.32636 | 5.366456 | 6.9895996 |
| FOCAL LENGTH OF TOTAL SYSTEM | 7.0085 | 12.27175 | 17.320641 |
| BACK-FOCAL DISTANCE (ON AIR BASIS) | 6.18600 | 6.22610 | 7.84924 |
| FNO. | 3.40 | 4.59 | 5.25 |
| VIEW ANGLE 2ω | 51.18° | 30.70° | 22.23° |

FIG. 19

| CONDITIONAL EXPRESSION | EXAMPLE 1 | EXAMPLE 2 | EXAMPLE 3 | EXAMPLE 4 |
|---|---|---|---|---|
| (1) f2/f4 | 0.4013 | 0.5167 | 0.4629 | 0.4452 |
| (2) (dt-dw)/fw | 0.0970 | 0.1980 | 0.2531 | 0.0724 |
| (3) f4/fw | 1.9205 | 1.9352 | 1.7375 | 1.7040 |
| (4) νd1 | 57.6 | 57.6 | 57.6 | 57.6 |

FIG. 20

| DATA ON TEMPERATURE CORRECTION IN EXAMPLE 1 | | |
|---|---|---|
| | WIDE-ANGLE END | TELEPHOTO END |
| FOCUS DISPLACEMENT A (mm) AT RISE OF 30C° | 0.1138 | 0.1760 |
| FOCUS VALUE (mm) AT OBJECT DISTANCE OF 0.2m | 0.0799 | 0.2905 |
| FOCUS DISPLACEMENT SENSITIVITY B | −3.1939 | −5.7470 |
| CORRECTION VALUE−A/B (mm) AT RISE OF 30C° | 0.0356 | 0.0306 |

FIG. 21

| DATA ON TEMPERATURE CORRECTION IN EXAMPLE 2 | | |
|---|---|---|
| | WIDE-ANGLE END | TELEPHOTO END |
| FOCUS DISPLACEMENT A (mm) AT RISE OF 30C° | 0.1016 | 0.1677 |
| FOCUS VALUE (mm) AT OBJECT DISTANCE OF 0.2m | 0.07650 | 0.3457 |
| FOCUS DISPLACEMENT SENSITIVITY B | −3.6548 | −4.9586 |
| CORRECTION VALUE−A/B (mm) AT RISE OF 30C° | 0.0278 | 0.0338 |

FIG. 22

| DATA ON TEMPERATURE CORRECTION IN EXAMPLE 3 | | |
|---|---|---|
| | WIDE-ANGLE END | TELEPHOTO END |
| FOCUS DISPLACEMENT A (mm) AT RISE OF 30C° | 0.2189 | 0.3910 |
| FOCUS VALUE (mm) AT OBJECT DISTANCE OF 0.2m | 0.0629 | 0.3163 |
| FOCUS DISPLACEMENT SENSITIVITY B | −3.6287 | −5.4628 |
| CORRECTION VALUE−A/B (mm) AT RISE OF 30C° | 0.0603 | 0.0716 |

FIG. 23

| DATA ON TEMPERATURE CORRECTION IN EXAMPLE 4 | | |
|---|---|---|
| | WIDE-ANGLE END | TELEPHOTO END |
| FOCUS DISPLACEMENT A (mm) AT RISE OF 30C° | 0.1047 | 0.1732 |
| FOCUS VALUE (mm) AT OBJECT DISTANCE OF 0.2m | 0.0680 | 0.2264 |
| FOCUS DISPLACEMENT SENSITIVITY B | −3.4533 | −6.5749 |
| CORRECTION VALUE−A/B (mm) AT RISE OF 30C° | 0.0303 | 0.0263 |

FIG. 27A

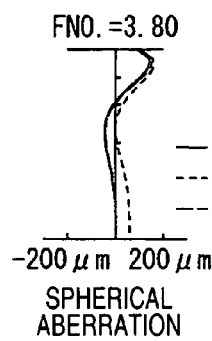

FNO.=3.80

SPHERICAL ABERRATION
−200μm 200μm
— d-LINE
--- g-LINE
-- C-LINE

FIG. 27B

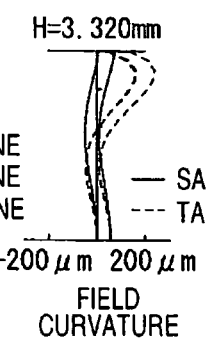

H=3.320mm

FIELD CURVATURE
−200μm 200μm
— SAGITTAL
--- TANGENTIAL

FIG. 27C

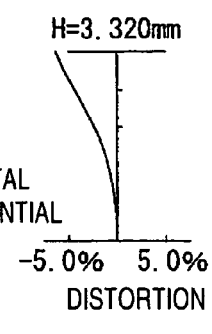

H=3.320mm

DISTORTION
−5.0% 5.0%

FIG. 27D

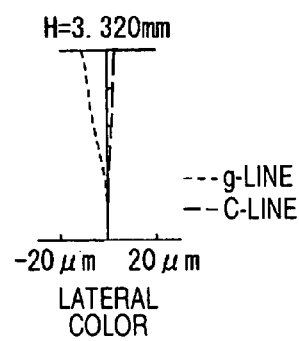

H=3.320mm

LATERAL COLOR
−20μm 20μm
--- g-LINE
-- C-LINE

FIG. 28A

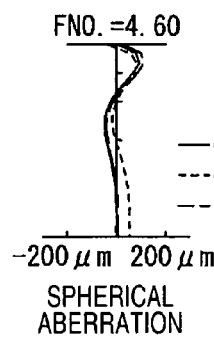

FNO.=4.60

SPHERICAL ABERRATION
−200μm 200μm
— d-LINE
--- g-LINE
-- C-LINE

FIG. 28B

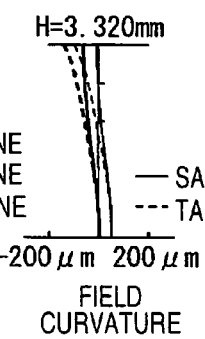

H=3.320mm

FIELD CURVATURE
−200μm 200μm
— SAGITTAL
--- TANGENTIAL

FIG. 28C

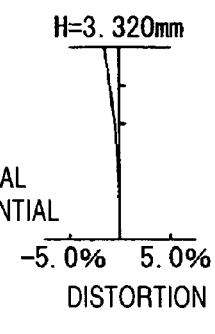

H=3.320mm

DISTORTION
−5.0% 5.0%

FIG. 28D

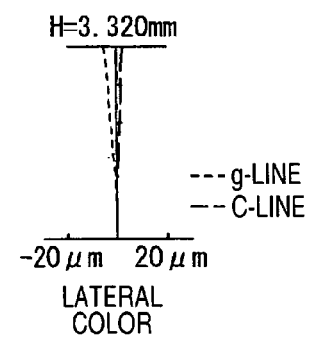

H=3.320mm

LATERAL COLOR
−20μm 20μm
--- g-LINE
-- C-LINE

FIG. 29A

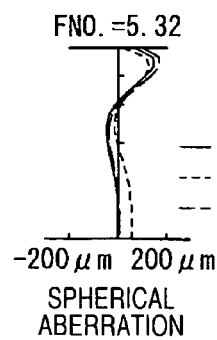

FNO.=5.32

SPHERICAL ABERRATION
−200μm 200μm
— d-LINE
--- g-LINE
-- C-LINE

FIG. 29B

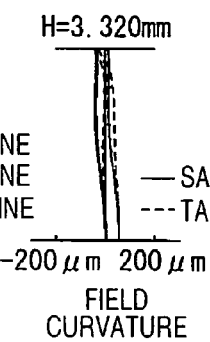

H=3.320mm

FIELD CURVATURE
−200μm 200μm
— SAGITTAL
--- TANGENTIAL

FIG. 29C

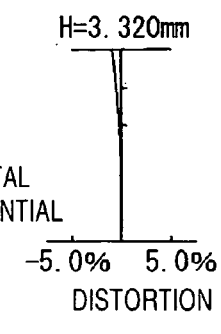

H=3.320mm

DISTORTION
−5.0% 5.0%

FIG. 29D

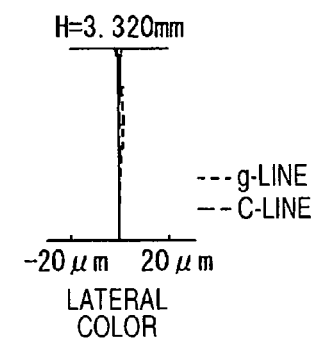

H=3.320mm

LATERAL COLOR
−20μm 20μm
--- g-LINE
-- C-LINE

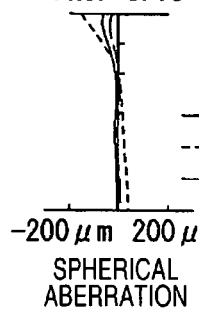

FIG. 30A
FNO.=3.73
— d-LINE
--- g-LINE
-- C-LINE
-200μm 200μm
SPHERICAL
ABERRATION

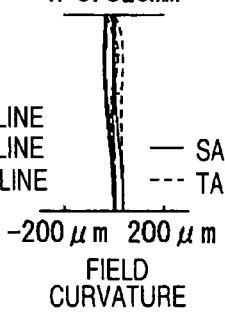

FIG. 30B
H=3.320mm
— SAGITTAL
--- TANGENTIAL
-200μm 200μm
FIELD
CURVATURE

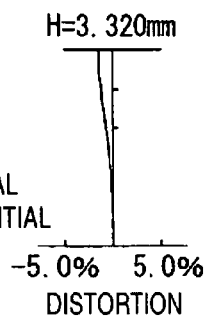

FIG. 30C
H=3.320mm
-5.0% 5.0%
DISTORTION

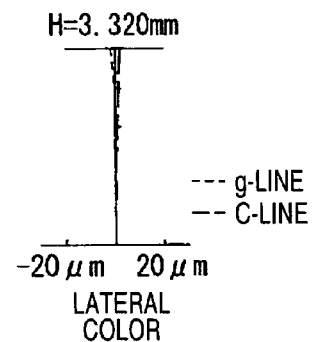

FIG. 30D
H=3.320mm
--- g-LINE
-- C-LINE
-20μm 20μm
LATERAL
COLOR

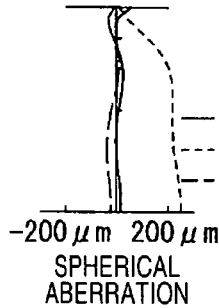

FIG. 31A
FNO.=4.85
— d-LINE
--- g-LINE
-- C-LINE
-200μm 200μm
SPHERICAL
ABERRATION

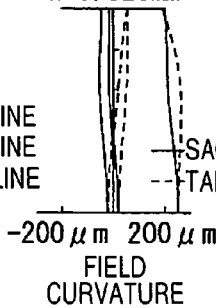

FIG. 31B
H=3.320mm
— SAGITTAL
--- TANGENTIAL
-200μm 200μm
FIELD
CURVATURE

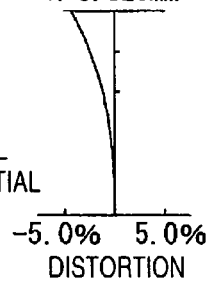

FIG. 31C
H=3.320mm
-5.0% 5.0%
DISTORTION

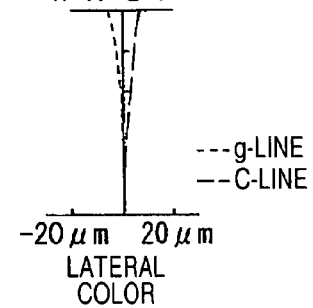

FIG. 31D
H=3.320mm
--- g-LINE
-- C-LINE
-20μm 20μm
LATERAL
COLOR

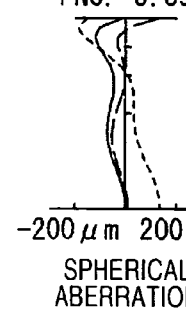

FIG. 32A
FNO.=5.89
— d-LINE
--- g-LINE
-- C-LINE
-200μm 200μm
SPHERICAL
ABERRATION

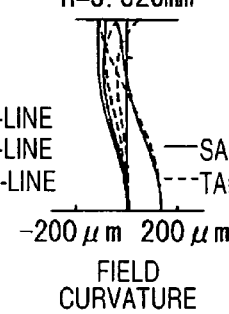

FIG. 32B
H=3.320mm
— SAGITTAL
--- TANGENTIAL
-200μm 200μm
FIELD
CURVATURE

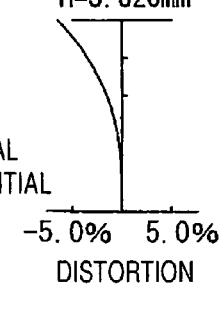

FIG. 32C
H=3.320mm
-5.0% 5.0%
DISTORTION

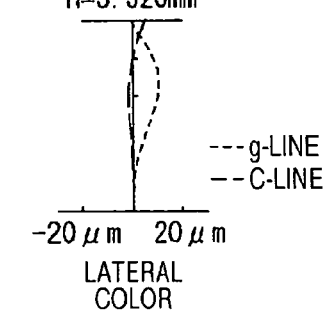

FIG. 32D
H=3.320mm
--- g-LINE
-- C-LINE
-20μm 20μm
LATERAL
COLOR

|  | W. INF | W. 0.2 | M. INF | M. 0.2 | T. INF | T. 0.2 |
|---|---|---|---|---|---|---|
| FIRST LENS G1 | 25.5247 | 25.5247 | 21.0727 | 21.0727 | 20.251 | 20.251 |
| SECOND LENS G2 | 10.8505 | 10.8505 | 15.3918 | 15.3918 | 18.6137 | 18.6137 |
| THIRD LENS G3 | 9.103 | 9.0265 | 12.8689 | 12.6797 | 15.3614 | 15.0157 |
| FOURTH LENS G4 | 7.9313 | 7.9313 | 7.9314 | 7.9314 | 7.9314 | 7.9314 |

|  | W. INF | W. 0.2 | M. INF | M. 0.2 | T. INF | T. 0.2 |
|---|---|---|---|---|---|---|
| FIRST LENS G1 | 25.5247 | 25.5247 | 21.0727 | 21.0727 | 20.251 | 20.251 |
| SECOND LENS G2 | 10.8505 | 10.8505 | 15.3918 | 15.3918 | 18.6137 | 18.6137 |
| THIRD LENS G3 | 8.9265 | 9.203 | 12.5297 | 13.0189 | 14.8157 | 15.5614 |
| FOURTH LENS G4 | 7.9313 | 7.9313 | 7.9314 | 7.9314 | 7.9314 | 7.9314 |

ZOOM LENS

BACKGROUND OF THE INVENTION

1. Field of the Invention

The present invention relates to a zoom lens suitable to be mounted on an electronic still camera or a camera module for a mobile terminal using an imaging device such as a CCD (Charge-Coupled Device), a CMOS (Complementary Metal Oxide Semiconductor) or the like.

2. Description of Related Art

There has been heretofore developed an electronic imaging apparatus such as an electronic still camera (also referred to as "digital still camera"), an electronic video camera or a camera module for a mobile terminal using an imaging device such as a CCD, a CMOS or the like. In recent years, with the popularization of personal computers over general homes, image information of photographed scenes, persons, etc. can be inputted into personal computers so as to be processed and distributed easily. Thus, the market for the electronic imaging apparatuses has been expanding rapidly.

In these circumstances, imaging lenses (particularly zoom lenses) to be mounted on electronic imaging apparatuses have been intensely demanded to have a good balance among performance, cost and size. As the zoom lens in the background art, there have been known zoom lenses disclosed in JP-A-2003-177315 and JP-A-2005-004020. Each of the zoom lenses disclosed in JP-A-2003-177315 and JP-A-2005-004020 has a four-lens configuration. Specifically, the zoom lens disclosed in JP-A-2003-177315 has a first group constituted by a negative single lens, a second group having a two-lens configuration of a positive lens and a negative lens, and a third group constituted by a positive single lens. In zooming, the first group and the second group can be moved while the third group is fixed. On the other hand, the zoom lens disclosed in JP-A-2005-004020 has a first negative lens group having one positive lens and one negative lens, and a second positive lens group having one positive lens and one negative lens, which lens groups are disposed in this order from the object side. In zooming, the mutual distance between the first lens group and the second lens group is varied.

As a system having a structure similar to those of the imaging zoom lenses, an objective lens system may be mounted on a real image system optical zoom finder (hereinafter referred to as "finder" simply) (for example, see JP-A-9-211547). The finder disclosed in JP-A-9-211547 has an objective lens system and an ocular lens system each having a four-lens configuration with a light shielding unit in a position. Thus, the finder can be made compact and shielded from harmful beams of light causing flare. In such a finder, generally, the objective lens system has a zoom configuration, an erect prism system is provided between the objective lens system and the ocular lens system. The erect prism system is made of not glass but plastic in view from reduction in cost. Thus, in the erect prism system, a reflecting coat is often absent from its reflecting surface. Therefore, the objective lens system is designed so that a beam of light incident on the erect prism system is telecentric.

However, the objective lens system in the finder as disclosed in JP-A-9-211547 is not provided with a fixed aperture stop. This is because the pupil diameter of an observer itself using the finder serves as a fixed aperture stop. In addition, a beam of light leaving the objective lens system and entering the erect prism system is telecentric system. The position and the aperture of each lens in the objective lens system are generally varied in zooming. On the other hand, an imaging zoom lens needs an aperture stop. Therefore, if the objective lens system of the finder is used as an imaging zoom lens as it is, the imaging performance will be affected by a difference in height of incidence of the beam. Further, the erect prism system is disposed in the finder as described above. It is therefore necessary to secure a comparatively large back-focal distance corresponding to the erect prism system. Thus, the finder tends to lack compactness. For example, in the finder disclosed in JP-A-9-211547, the ratio of the back-focal distance to the screen diagonal size on the imaging plane of the objective lens system is 2.12 (on an air basis) when it is estimated from the incident view angle. Further, such a finder includes many parts depending on the adjustability of the observer's eye. When the objective lens system serves as an imaging zoom lens, the objective lens system cannot be regarded as sufficient in terms of performance about distortional aberration, spherical aberration, chromatic aberration, etc. In JP-A-9-211547, a highly dispersed material having an Abbe number of 30.0 is used as a constituent material of the first lens group L1. This is because the pupil corresponding to a fixed aperture stop is located on the side of the eyepiece system.

The zoom lens disclosed in JP-A-2003-177315 is a zoom lens for an electronic imaging device to be mounted on a camera module mainly for a mobile terminal. The zoom lens is short in full length and compact, but the back-focal distance is too short to secure flange-focal distance. Further, the exit angle in the wide-angle end is about 20°, which is too large to serve as a general-purpose zoom lens for an imaging device. On the other hand, in the zoom lens disclosed in JP-A-2005-004020, a positive lens and a negative lens are paired in each of the first and second lens groups. It is therefore possible to suppress various aberrations occurring inside each of the first and second lens groups. On the contrary, however, the refracting power of each lens group cannot be made very high. Therefore, if the zoom ratio is to be increased to about three times while good optical performance is kept, the moving distance of each lens group will increase. As a result, the full length of the zoom lens will increase, or the lens diameter will be increased.

SUMMARY OF THE INVENTION

An object of an illustrative, non-limiting embodiment of the invention is to provide a zoom lens showing high imaging performance in spite of its compact configuration.

A zoom lens according to one aspect of the invention is a zoom lens having a four-lens configuration including a first lens of a negative lens, a second lens of a positive lens, an aperture stop, a third lens of a negative lens and a fourth lens of a positive lens disposed in this order from an object side of the zoom lens. Mutual distances among the first to fourth lenses are varied to perform a zooming operation, and the zoom lens is designed to satisfy all the following conditional expressions (1) to (4). Assume that f2 designates a focal length of the second lens, f4 designates a focal length of the fourth lens, dt designates a distance along an optical axis between the second lens and the third lens in a wide-angle end of the zoom lens, dw designates a distance along the optical axis between the second lens and the third lens in a telephoto end of the zoom lens, fw designates a focal length of a total system of the zoom lens in the telephoto end, and vd1 designates an Abbe number of the first lens at the d-line. Here, the mutual distances among the first to fourth lenses include a distance between the first lens and the second lens, a distance between the second lens and the third lens, and a distance between the third lens and the fourth lens.

$$0.35 < f2/f4 < 0.70 \quad (1)$$

$$0.04 < (dt-dw)/fw < 0.40 \quad (2)$$

$$1.65 < f4/fw < 2.20 \quad (3)$$

$$50 < vd1 \quad (4)$$

In the zoom lens according to one aspect of the invention, a small number of lenses, that is, four lenses are disposed, and respective mutual distances among the four lenses are varied. Accordingly, a higher zoom ratio can be secured, and the zoom lens can be made compact. In addition, good imaging performance can be secured. Here, the ratio of the focal length of the second lens to the focal length of the fourth lens satisfies the conditional expression (1). Thus, miniaturization of the whole size of the zoom lens and proper setting of the exit angle of off-axis light can be attained compatibly. Further, due to the configuration satisfying the conditional expression (2), various aberrations can be corrected well, and the back-focal distance can be set properly. Further, since the conditional expression (3) is satisfied, the back-focal distance and the exit angle of off-axis light can be set properly. Further, since the conditional expression (4) is satisfied, axial chromatic aberration can be reduced.

In the zoom lens according to one aspect of the invention, for example, at least the second lens and the third lens are designed to move along the optical axis so as to vary the mutual distances among the first to fourth lenses. A distance between the fourth lens and an imaging plane may be kept constant at least in the zooming operation, or the first lens and the fourth lens may be designed to jointly move along the optical axis. Alternatively, a distance between the first lens and an imaging plane may be kept constant.

In the zoom lens according to one aspect of the invention, it is desired that the third lens is designed to move along the optical axis so as to perform a focusing operation. When the third lens group serves as a focusing lens, only a relatively small moving distance is required for the focusing operation. In addition, deterioration of an image hardly occurs due to a field curvature or the like. In the zoom lens according to one aspect of the invention, it is advantageous in terms of reduction in cost and weight that at least the first lens and the second lens are made of organic materials.

The zoom lens according to one aspect of the invention may further include a temperature sensing portion for measuring an environmental temperature, a control portion for calculating a correction value of a focal point correction based on temperature information from the temperature sensing portion, and a driving portion for moving at least one of the first to fourth lenses by a distance corresponding to the correction value of the focal point in response to a control signal from the control portion.

The zoom lens according to one aspect of the invention may be designed so that at least the third lens is designed to move continuously along the optical axis so as to perform a zooming operation and a focusing operation alternately.

In the zoom lens according to one aspect of the invention, a reflection surface forming a bending optical system may be provided in or near the first lens.

BRIEF DESCRIPTION OF THE DRAWINGS

The features of the invention will appear more fully upon consideration of the exemplary embodiment of the invention, which are schematically set forth in the drawings, in which:

FIGS. 1A-1C are sectional views showing a first configuration example of a zoom lens according to an exemplary embodiment of the invention, correspondingly to Example 1;

FIG. 7 is an explanatory table showing fundamental lens data in a zoom lens of Example 1;

FIG. 8 is an explanatory table showing fundamental lens data in a zoom lens of Example 2;

FIG. 9 is an explanatory table showing fundamental lens data in a zoom lens of Example 3;

FIG. 10 is an explanatory table showing fundamental lens data in a zoom lens of Example 4;

FIG. 11 is an explanatory table showing data about aspheric surfaces in the zoom lens of Example 1;

FIG. 12 is an explanatory table showing data about aspheric surfaces in the zoom lens of Example 2;

FIG. 13 is an explanatory table showing data about aspheric surfaces in the zoom lens of Example 3;

FIG. 14 is an explanatory table showing data about aspheric surfaces in the zoom lens of Example 4;

FIG. 15 is an explanatory table showing other data in the zoom lens of Example 1;

FIG. 16 is an explanatory table showing other data in the zoom lens of Example 2;

FIG. 17 is an explanatory table showing other data in the zoom lens of Example 3;

FIG. 18 is an explanatory table showing other data in the zoom lens of Example 4;

FIG. 19 is an explanatory table showing numeric values corresponding to conditional expressions (1)-(4) in the zoom lenses of Examples 1-4;

FIG. 20 is an explanatory table showing data about temperature compensation in the zoom lens of Example 1;

FIG. 21 is an explanatory table showing data about temperature compensation in the zoom lens of Example 2;

FIG. 22 is an explanatory table showing data about temperature compensation in the zoom lens of Example 3;

FIG. 23 is an explanatory table showing data about temperature compensation in the zoom lens of Example 4;

FIGS. 27A-27D are aberration diagrams showing spherical aberration, field curvature, distortional aberration, and lateral color in the wide-angle end in the zoom lens of Example 2;

FIGS. 28A-28D are aberration diagrams showing spherical aberration, field curvature, distortional aberration, and lateral color in the intermediate state in the zoom lens of Example 2;

FIGS. 29A-29D are aberration diagrams showing spherical aberration, field curvature, distortional aberration, and lateral color in the telephoto end in the zoom lens of Example 2;

FIGS. 30A-30D are aberration diagrams showing spherical aberration, field curvature, distortional aberration, and lateral color in the wide-angle end in the zoom lens of Example 3;

FIGS. 31A-31D are aberration diagrams showing spherical aberration, field curvature, distortional aberration, and lateral color in the intermediate state in the zoom lens of Example 3;

FIGS. 32A-32D are aberration diagrams showing spherical aberration, field curvature, distortional aberration, and lateral color in the telephoto end in the zoom lens of Example 3;

DETAILED DESCRIPTION OF THE EXEMPLARY EMBODIMENTS

Figure 2A:
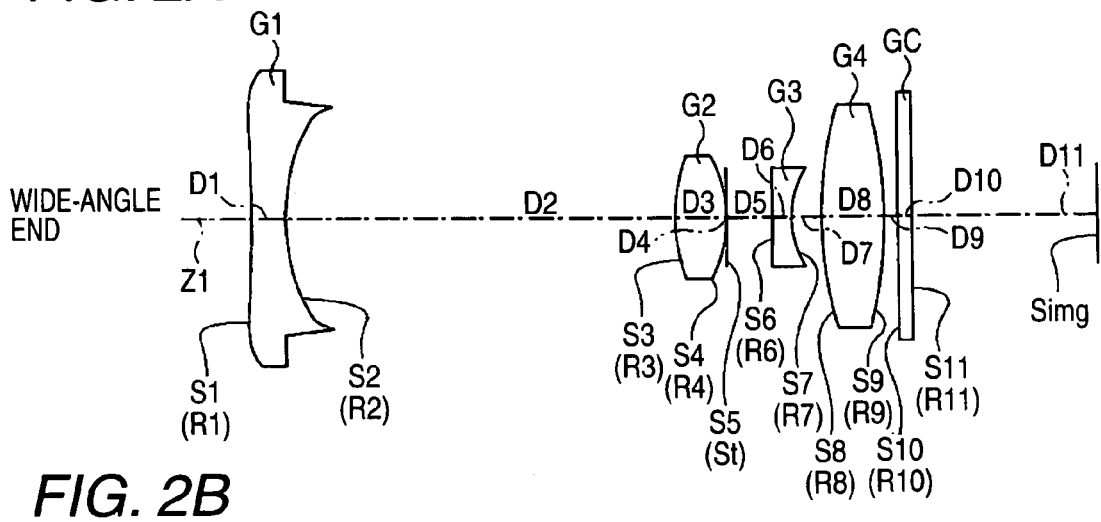
FIGS. 2A-2C are sectional views showing a second configuration example of a zoom lens according to an exemplary embodiment of the invention, correspondingly to Example 2.
Figure 2B:
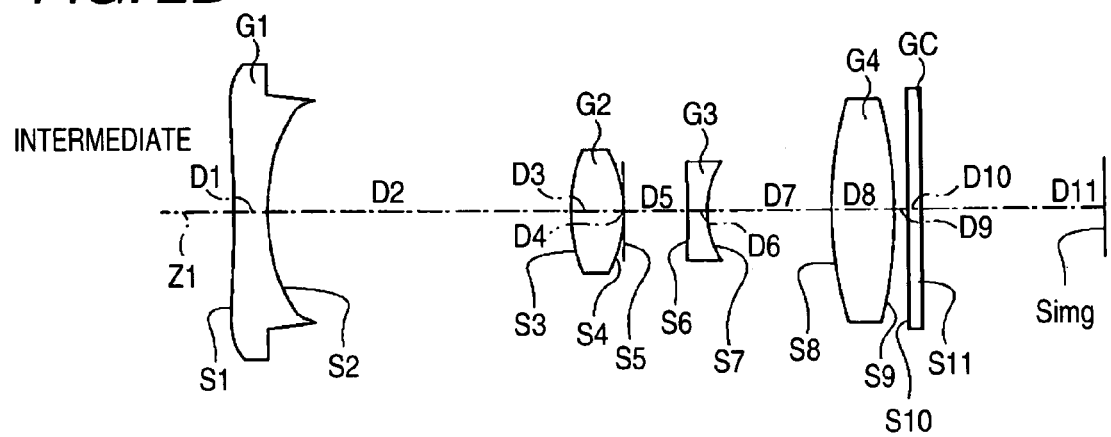
Figure 2C:
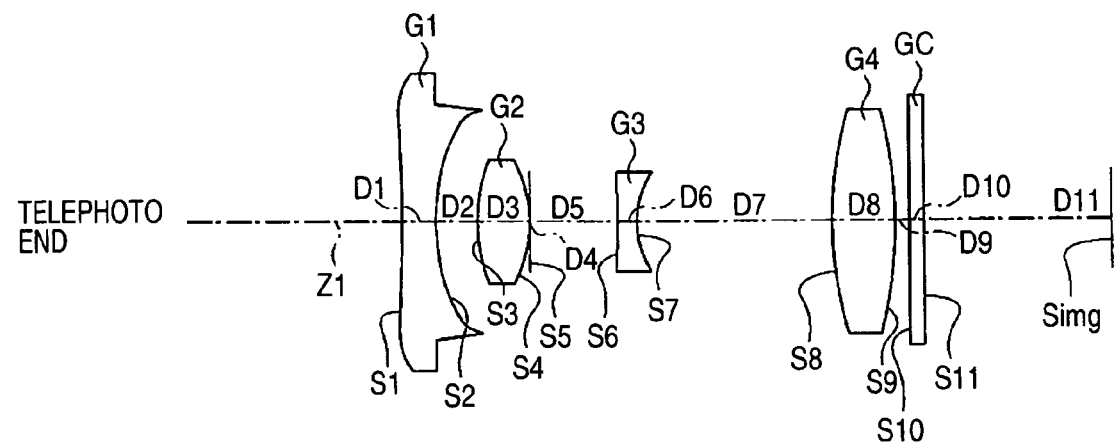

Although the invention will be described below with reference to the exemplary embodiments thereof, the following exemplary embodiments and modifications do not restrict the invention.

According to an zoom lens in an exemplary embodiment of the invention, a first negative lens, a second positive lens, an aperture stop, a third negative lens and a fourth positive lens are disposed in this order from the object side. Mutual distances among the first to fourth lenses are varied respectively to perform zooming, and the zoom lens is designed to satisfy all the predetermined conditional expressions (1) to (4). Accordingly, the zoom lens can be made compact while securing a sufficient zoom ratio. In addition, the zoom lens can show high imaging performance.

Exemplary embodiments of the invention will be described below in detail with reference to the drawings.

FIGS. 1A-1C show a first configuration example of a zoom lens according to an exemplary embodiment of the invention. This configuration example corresponds to the lens configuration of a first numerical example (FIGS. 7 and 11) which will be described later. FIGS. 2A-2C to 4A-4C show second to fourth configuration examples of zoom lenses according to exemplary embodiments of the invention respectively. The second configuration example corresponds to the lens configuration of a second numerical example (FIGS. 8 and 12) which will be described later. The third configuration example corresponds to the lens configuration of a third numerical example (FIGS. 9 and 13) which will be described later. The fourth configuration example corresponds to the lens configuration of a fourth numerical example (FIGS. 10 and 14) which will be described later. In FIGS. 1A-1C to 4A-4C, the reference sign Si designates an i-th surface on the assumption that the first surface is a surface of a constituent element located nearest to an object side, and the suffix i is given to increase sequentially as the i-th surface Si is nearer to an image side (imaging side). The reference sign Ri designates the curvature radius of the surface Si. The reference sign Di designates a distance along an optical axis Z1 between the i-th surface Si and the (i+1)-th surface Si+1. Since the basic configuration is the same among the respective configuration examples, the following description will be made based on the configuration example of the zoom lens shown in FIGS. 1A-1C, and the configuration examples of FIGS. 2A-2C to 4A-4C will be described if necessary.

This zoom lens is mounted and used in a digital camera or the like using an imaging device such as a CCD or a CMOS. The zoom lens has a configuration in which a first lens G1, a second lens G2, a third lens G3 and a fourth lens G4 are disposed in this order from the object side along an optical axis Z1. An imaging device (not shown) such as a CCD is disposed on an image plane (imaging plane) Simg of the zoom lens. A cover glass GC for protecting the imaging plane Simg of the imaging device is disposed between the fourth lens G4 and the imaging plane Simg. In addition to the cover glass GC, another optical member such as an infrared cut filter or a low pass filter may be disposed.

The first lens G1 has a negative refracting power. For example, the first lens G1 has a meniscus shape near the paraxial axis (first configuration example). Alternatively, the first lens G1 may have a double-concave shape near the paraxial axis (second to fourth configuration examples). In addition, an object-side surface S1 of the first lens G1 has a curvature whose absolute value is larger than that of an image-side surface S2 thereof. Further, it is desired that at least one of the surfaces S1 and S2 is aspheric. Especially it is desired that both the surfaces S1 and S2 are aspheric.

The second lens G2 has a positive refracting power. For example, the second lens G2 has a double-convex shape near the paraxial axis. In addition, an aperture stop St for defining brightness is provided in the position of an image-side surface of the second lens G2. The aperture stop always moves jointly with the second lens G2. Further, it is desired that at least one of surfaces S3 and S4 of the second lens G2 is aspheric. Especially it is desired that both the surfaces S3 and S4 are aspheric. The second lens G2 has the largest contribution to the zooming operation.

The third lens G3 has a negative refracting power. For example, the third lens G3 has a double-concave shape near the paraxial axis (first and fourth configuration examples). Alternatively, the third lens G3 may have a meniscus shape (second and third configuration examples). In addition, an object-side surface S6 of the third lens G3 has a curvature whose absolute value is larger than that of an image-side surface S7 thereof. Further, it is desired that at least one of the surfaces S6 and S7 is aspheric. Especially it is desired that both the surfaces S6 and S7 are aspheric.

The fourth lens G4 has a positive refracting power. For example, the fourth lens G4 has a double-convex shape near the paraxial axis (first to third configuration examples). Alternatively, the fourth lens G4 has a meniscus shape (fourth configuration example).

There is a request to reduce the weight and the cost, while there is another request to suppress the fluctuation of a focal point caused by a change of environmental temperature. In order to establish the compatibility of the two requests, it is desired that the first lens G1 and the second lens G2 are made of organic materials. In addition thereto, it is more preferable that the third lens G3 is made of an organic material. Thus, it is easier to suppress deterioration in imaging performance.

In this embodiment, the lens shape near the paraxial axis is, for example, expressed by the portion involved with a coefficient K (the portion excluding the polynomial portion involved with a coefficient An) in the aspheric equation (ASP) which will be described later.

Further, the zoom lens is designed to satisfy all the following conditional expressions (1) to (4). Assume that f2 designates the focal length of the second lens G2, f4 designates the focal length of the fourth lens G4, dt designates the distance along the optical axis Z1 between the second lens G2 and the third lens G3 in the wide-angle end, dw designates the distance along the optical axis Z1 between the second lens G2 and the third lens G3 in the telephoto end, fw designates the focal length of the total system of the zoom lens in the telephoto end, and vd1 designates the Abbe number of the first lens G1 at the d-line.

$$0.35 < f2/f4 < 0.70 \quad (1)$$

$$0.04 < (dt-dw)/fw < 0.40 \quad (2)$$

$$1.65 < f4/fw < 2.20 \quad (3)$$

$$50 < vd1 \quad (4)$$

Figure 5:
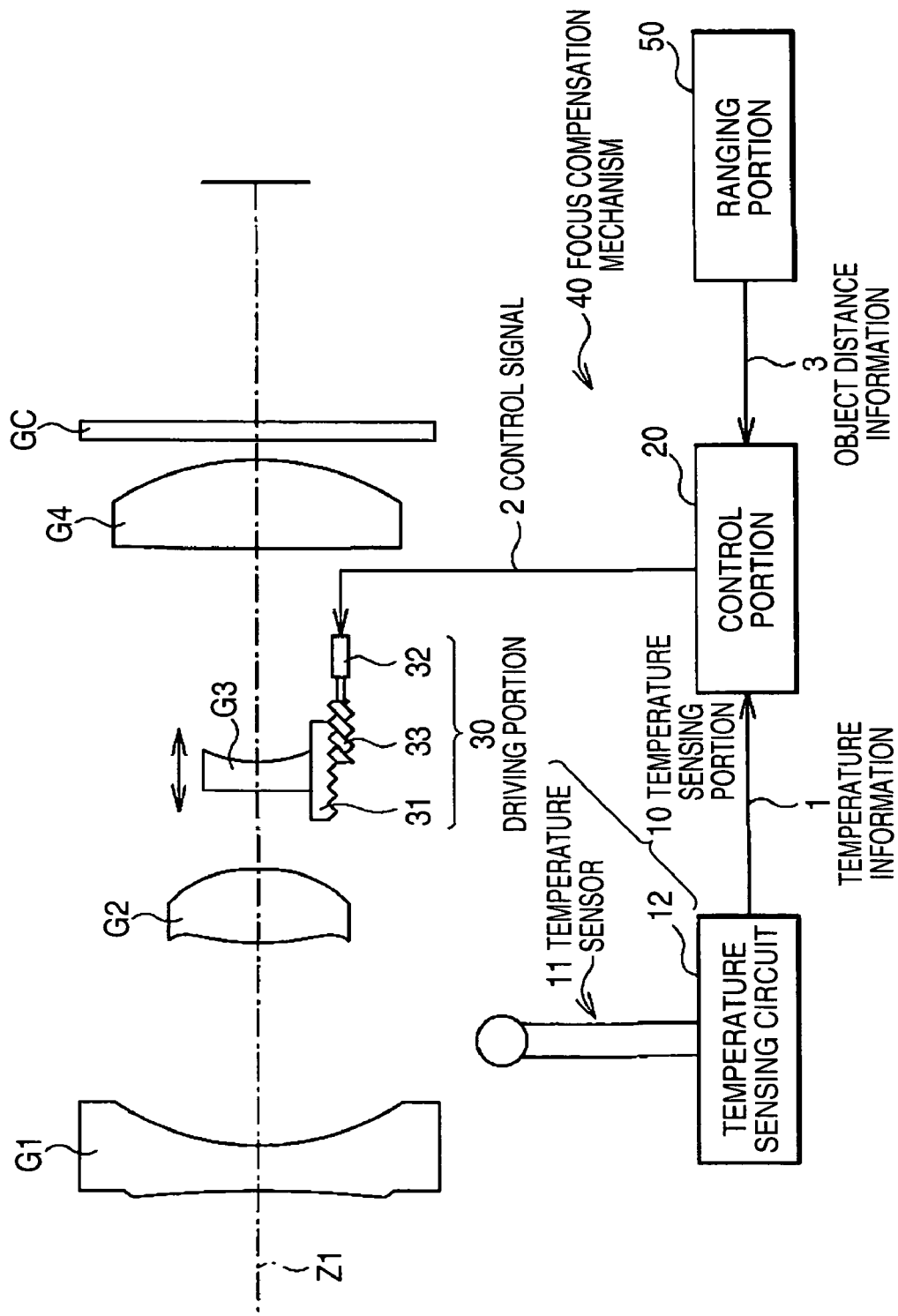
FIG. 5 is an explanatory diagram showing the configuration of a focus compensation mechanism in the zoom lens shown in FIGS. 1A to 1C.

Further, the zoom lens has a focus compensation mechanism 40 including a temperature sensing portion 10, a control portion 20 and a driving portion 30 as shown in FIG. 5. For example, the temperature sensing portion 10 has a temperature sensor 11 for measuring the environmental temperature around the zoom lens, and a temperature sensing circuit 12 for supplying temperature information 1 based on the value measured by the temperature sensor 11 to the control portion 20. The control portion 20 calculates a focal point correction value based on the temperature information 1 from the temperature sensing circuit 12, and sends a control signal 2 to the driving portion 30. The driving portion 30 serves to move the third lens G3 along the optical axis Z1 by a distance corresponding to the focal point correction value based on the control signal 2 from the control portion 20. For example, the driving portion 30 is constituted by a stage 31 mounted with the third lens G3, a motor 32 serving as a driving source for driving the stage 31, and a shaft 33 for transmitting a driving force of the motor 32 to the stage 31. The driving portion 30 moves together with the third lens G3 during the zooming operation.

The operation and effect of the zoom lens of this embodiment configured thus will be described below.

Figure 3A:
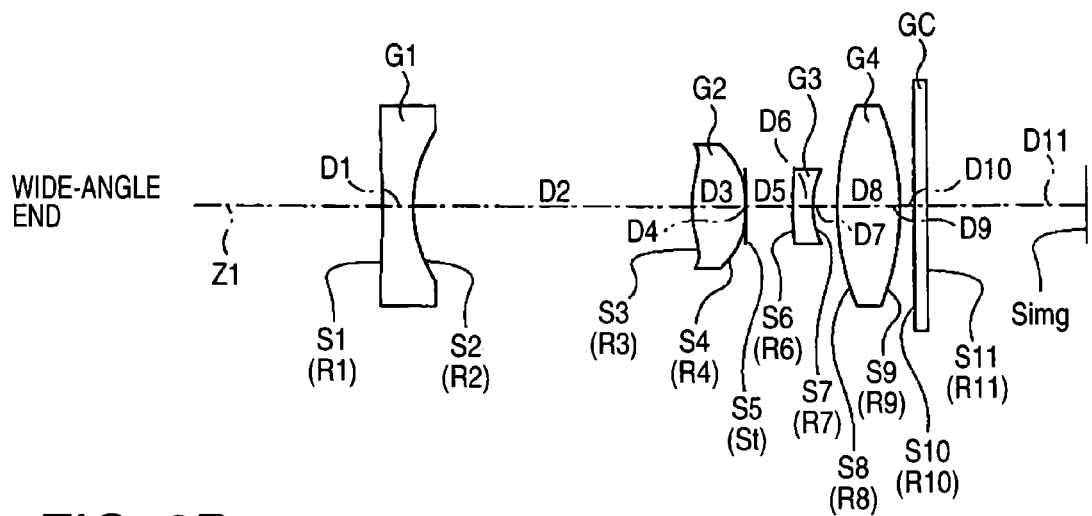
FIGS. 3A-3C are sectional views showing a third configuration example of a zoom lens according to an exemplary embodiment of the invention, correspondingly to Example 3.
Figure 3B:
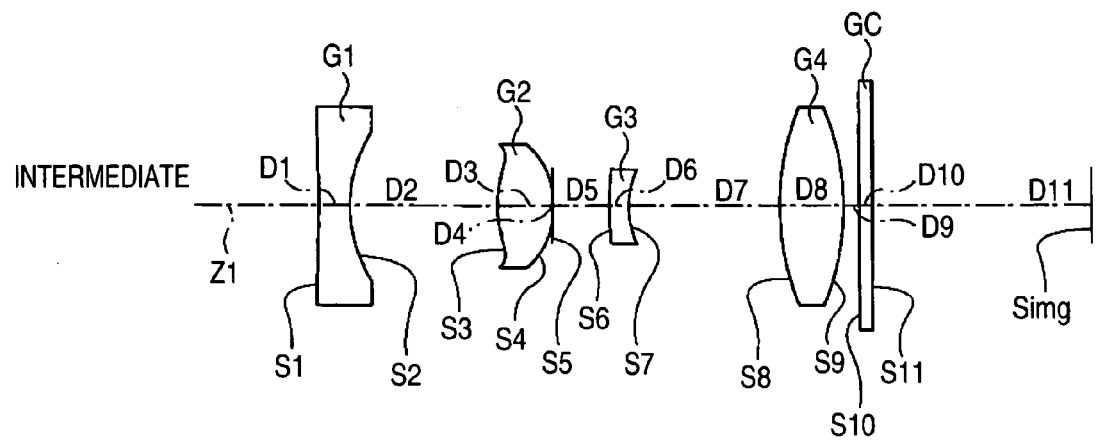
Figure 3C:
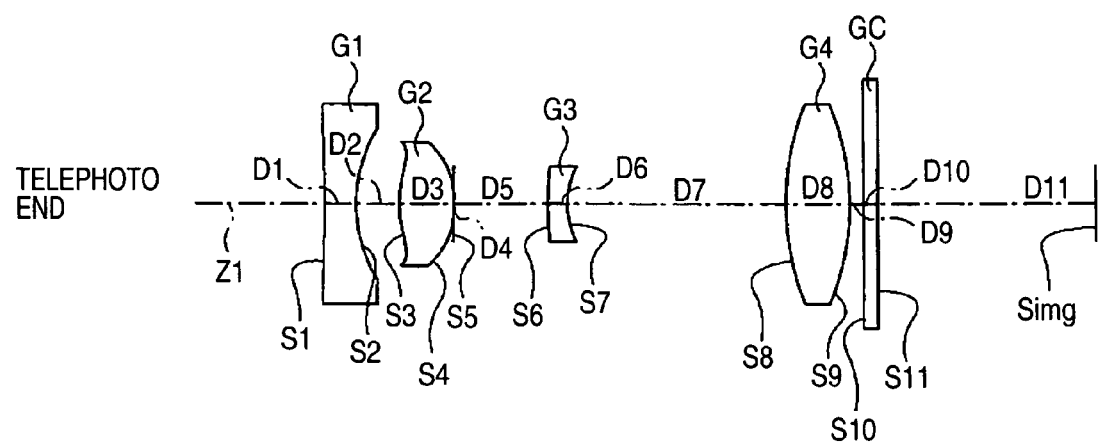
Figure 4A:
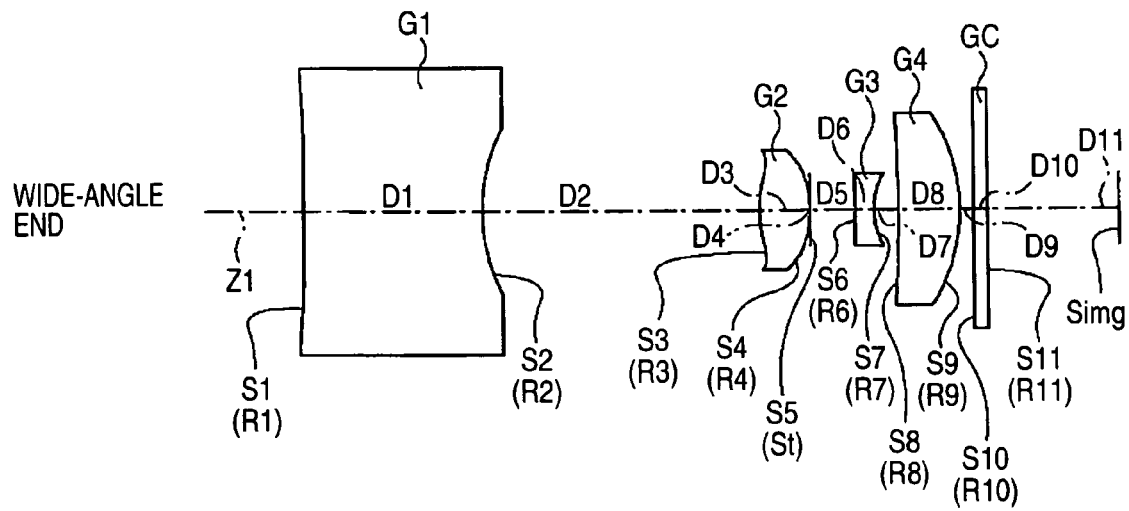
FIGS. 4A-4C are sectional views showing a fourth configuration example of a zoom lens according to an exemplary embodiment of the invention, correspondingly to Example 4.
Figure 4B:
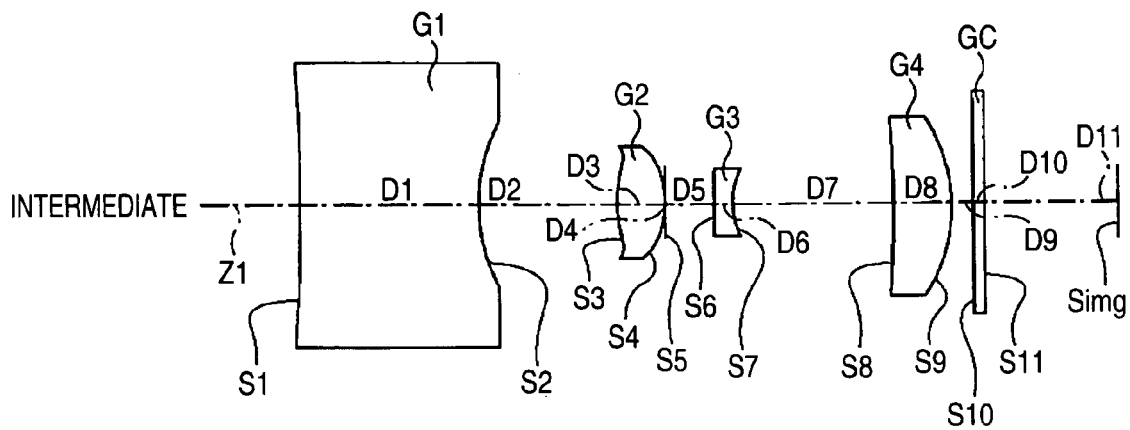
Figure 4C:
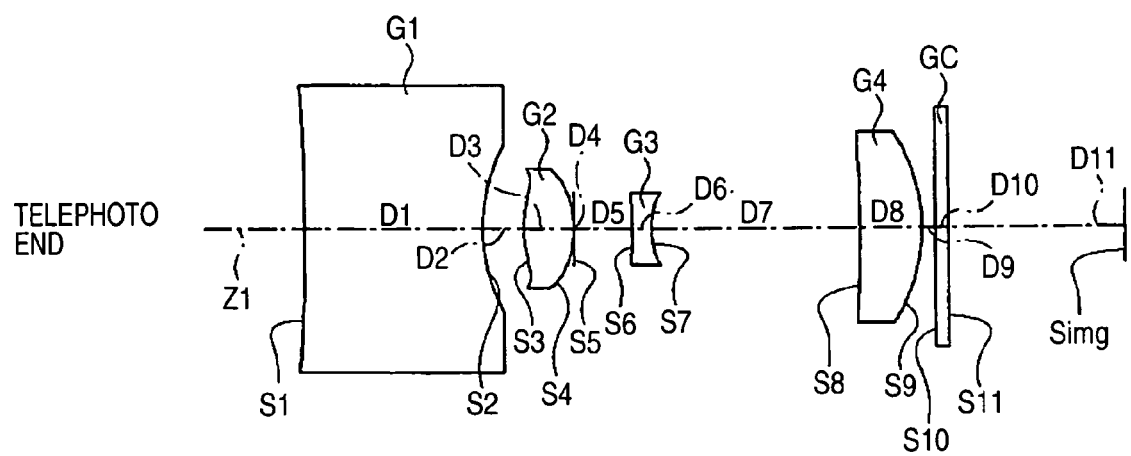

In the zoom lens, mutual distances among the first to fourth lenses G1 to G4 vary respectively during the zooming operation. That is, all the surface-to-surface distances D2, D5 and D7 vary to perform zooming. Each of the first to fourth configuration examples is designed so that zooming is performed chiefly by the movement of the second lens G2 along the optical axis Z1, while the other lenses have auxiliary functions about the zooming operation. The second lens G2 has the highest positive refracting power of the first to fourth lenses G1 to G4, and the beam height of an axial beam of light is the highest. Thus, the second lens G2 is an important factor defining the focal length and the back-focal distance of the total system of the zoom lens. The first configuration example is designed so that all the first to fourth lenses G1 to G4 are movable with reference to the imaging plane Simg. However, as shown in the second configuration example (FIGS. 2A-2C), the fourth lens G4 may be fixed so that the distance between the fourth lens G4 and the imaging plane Simg (the sum of the surface-to-surface distances D9 to D11, that is, the back-focal distance) can be kept constant. Alternatively, as shown in the third configuration example (FIGS. 3A-3C), the first and fourth lenses G1 and G4 may be moved along the optical axis Z1 together (i.e. to keep the sum of the surface-to-surface distances D2 to D7 constant) so as to perform the zooming operation. Alternatively, as shown in the fourth configuration example (FIGS. 4A-4C), the second to fourth lenses G2 to G4 may be moved along the optical axis Z1 in the condition that the distance between the first lens G1 and the imaging plane Simg is kept constant (that is, the first lens G1 is kept fixed), in order to perform the zooming operation.

The focusing operation is performed chiefly by the third lens G3 moving along the optical axis Z1. The third lens G3 moves to the image side along the optical axis Z1 when focusing is shifted from a point at infinity to a closest side. In this zoom lens, the third lens G3 is set as a focusing group. In comparison with the case where another lens is designed to move, the moving distance can be made smaller, and the fluctuation of the image can be suppressed to be comparatively slight. Thus, correction becomes easier. Particularly when the distance to an object is closest, it is possible to suppress deterioration in performance, and it is also easy to deal with correction of the displacement of a focus caused by an error in manufacturing or a change in temperature/humidity.

Figure 6:
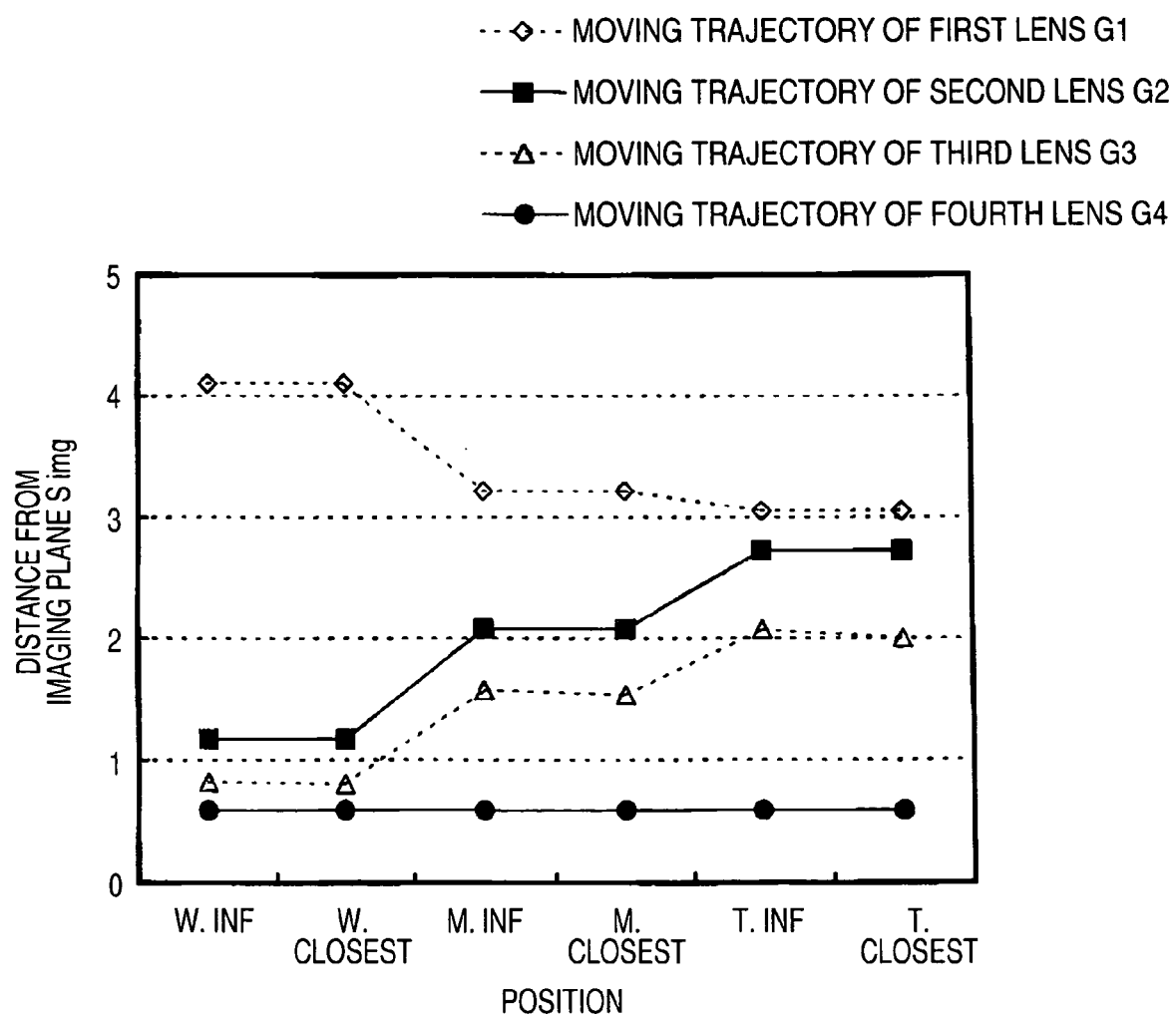
FIG. 6 is a conceptual graph showing a moving trajectory of each lens from a wide-angle end to a telephoto end in the zoom lens shown in FIGS. 2A to 2C.
Figure 24A:
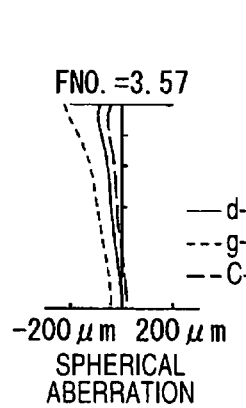
FIGS. 24A-24D are aberration diagrams showing spherical aberration, field curvature, distortional aberration, and lateral color in the wide-angle end in the zoom lens of Example 1.
Figure 24B:
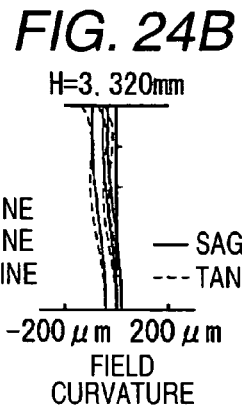
Figure 24C:
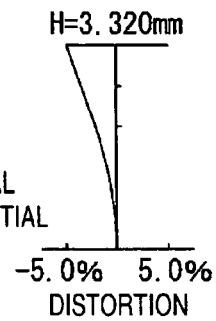
Figure 24D:
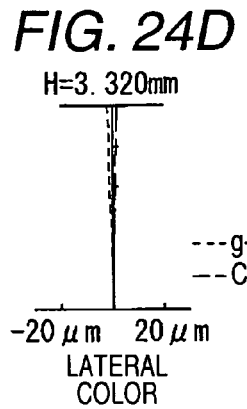
Figure 25A:
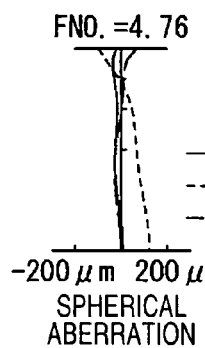
FIGS. 25A-25D are aberration diagrams showing spherical aberration, field curvature, distortional aberration, and lateral color in the intermediate state in the zoom lens of Example 1.
Figure 25B:
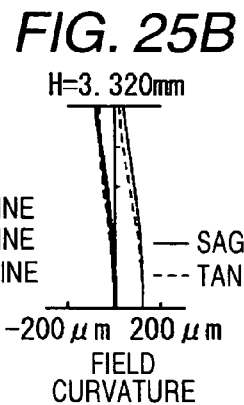
Figure 25C:
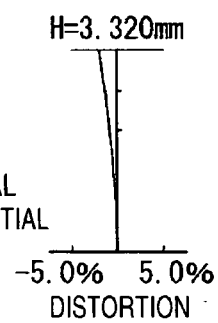
Figure 25D:
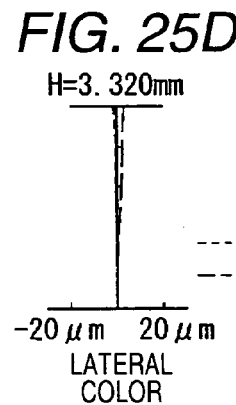
Figure 26A:
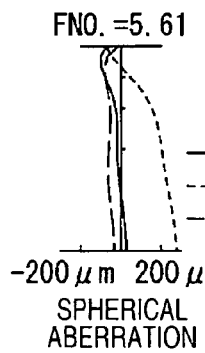
FIGS. 26A-26D are aberration diagrams showing spherical aberration, field curvature, distortional aberration, and lateral color in the telephoto end in the zoom lens of Example 1.
Figure 26B:
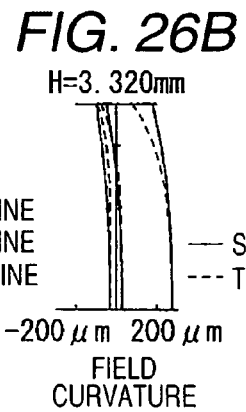
Figure 26C:
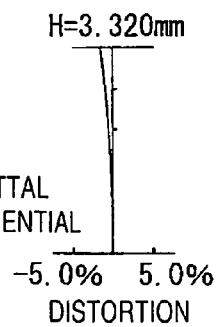
Figure 26D:
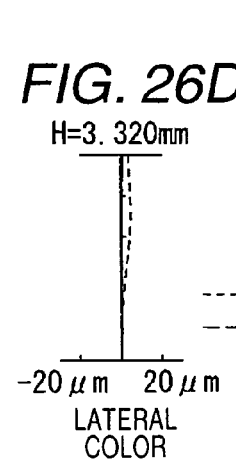
Figure 33A:
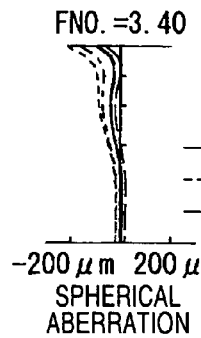
FIGS. 33A-33D are aberration diagrams showing spherical aberration, field curvature, distortional aberration, and lateral color in the wide-angle end in the zoom lens of Example 4.
Figure 33B:
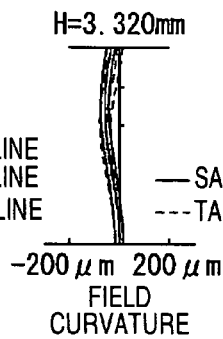
Figure 33C:
Figure 33D:
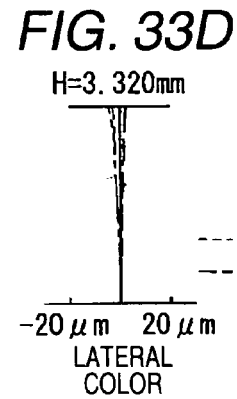
Figure 34A:
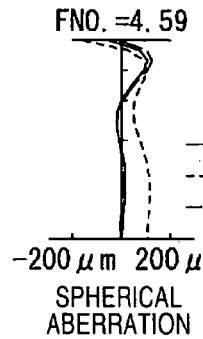
FIGS. 34A-34D are aberration diagrams showing spherical aberration, field curvature, distortional aberration, and lateral color in the intermediate state in the zoom lens of Example 4.
Figure 34B:
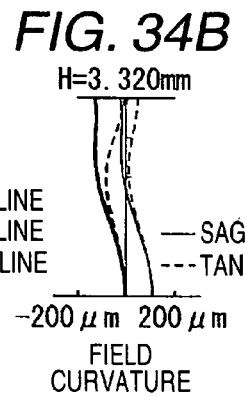
Figure 34C:
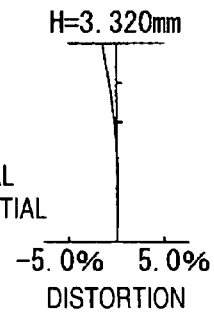
Figure 34D:
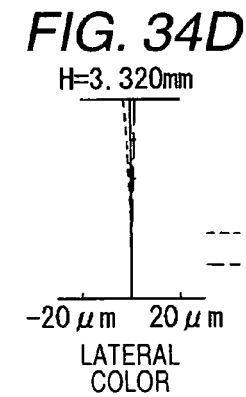
Figure 35A:
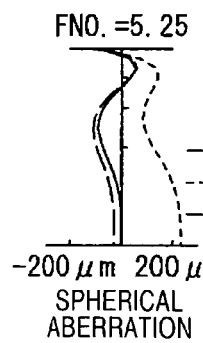
FIGS. 35A-35D are aberration diagrams showing spherical aberration, field curvature, distortional aberration, and lateral color in the telephoto end in the zoom lens of Example 4.
Figure 35B:
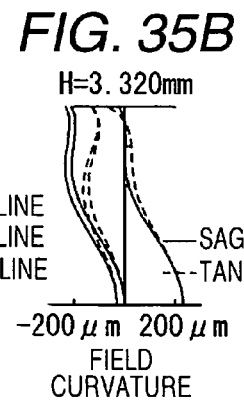
Figure 35C:
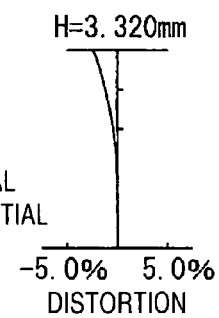
Figure 35D:
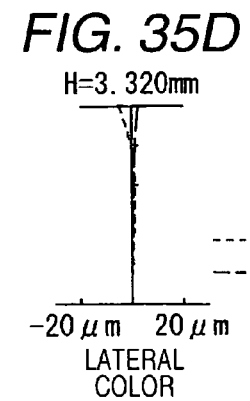

Particularly the zoom lens is designed so that the third lens G3 moves continuously along the optical axis Z1 so as to perform the zooming operation and the focusing operation alternately. FIG. 6 is a conceptual graph showing a moving trajectory of each lens from the wide-angle end to the telephoto end by way of example. The ordinate designates a distance between the position of the imaging plane Simg and each lens. The abscissa designates the position of each lens, that is, the state where the first to fourth lenses G1 to G4 are disposed. Specifically, W.INF designates a position in the wide-angle end when the distance to an object is at infinity, and W.CLOSEST designates a position in the wide-angle end when the distance to an object is closest (e.g. 0.2 m). Similarly, M.INF designates a position in an intermediate stage when the distance to an object is at infinity, and M.CLOSEST designates a position in the intermediate stage when the distance to an object is closest. Similarly, T.INF designates a position in the telephoto end when the distance to an object is at infinity, and T.CLOSEST designates a position in the telephoto end when the distance to an object is closest.

In FIG. 6, the region between W.INF and W.CLOSEST, the region between M.INF and M.CLOSEST and the region between T.INF and T.CLOSEST are focusing regions where focusing is adjusted. The region between W.CLOSEST and M.INF and the region between M.CLOSEST and T.INF are zooming regions where the zooming operation is performed. FIG. 6 shows an example where the first to third lenses G1 to G3 move along the optical axis, while the fourth lens G4 is fixed. Here, the distances of the first lens G1 and the second lens G2 from the imaging plane Simg vary only in the zooming regions but do not vary in the focusing regions. On the other hand, the third lens G3 is designed to change the distance from the imaging plane Simg both in the zooming regions and the focusing regions. Particularly the third lens G3 is designed to perform the zooming operation and the focusing operation alternately during a series of movements from the wide-angle end to the telephoto end. For example, one cam mechanism engaged in the third lens G3 is driven by one driving source. Thus, both the zooming operation and the focusing operation in the zoom lens can be performed. As a result, the time between when a shutter button is pushed and when photographing is performed can be shortened, and this can be attained by a simpler configuration. This configuration contributes to implementation of a camera which is superior in response speed in photographing operation and compact. Although the fourth lens G4 is fixed here, the fourth lens G4 may be designed to vary the distance from the imaging plane Simg in the zooming regions. Further, in the zoom lens according to this embodiment, the first lens G1, the second lens G2 and the fourth lens G4 are not inhibited from moving along the optical axis in the focusing regions. The zoom lens may be designed so that each lens is finely adjusted suitably in order to correct various aberrations. Further in FIG. 6, the position of each lens changes from W.INF to T.CLOSEST via W.CLOSEST, M.INF, M.CLOSEST and T.INF when the lens moves from the wide-angle end to the telephoto end. Differently from this order, the lens may be designed to change the position from W.CLOSEST to T.INF via W.INF, M.CLOSEST, M.INF and T.CLOSEST.

Further, in this zoom lens, the position of the third lens G3 is finely adjusted by the focus compensation mechanism 40 so as to correct the displacement of focus caused by a change of temperature in the ambient environment. The focus correction operation will be described below with reference to FIG. 5. The temperature sensing portion 10 uses the temperature sensor 11 to always monitor the environmental temperature of the zoom lens, and uses the temperature sensing circuit 12 to intermittently transmit the temperature information 1 to the control portion 20. Here, when the shutter button is pushed to start a photographing preparation operation, object distance information 3 is transmitted from a ranging portion 50 to the control portion 20. The control portion 20 compares the temperature information 1 with reference data corresponding to the object distance information 3, calculates a focal point correction value, and then specifies a moving operation of the third lens G3 through the control signal 2. The focal point correction value corresponds to a displacement between a focal point (reference position) corresponding to the object distance information 3 in a reference temperature and the focal point in an environmental temperature. When the control signal 2 is inputted to the driving portion 30, the shaft 33 is rotated by the motor 32 so that the third lens G3 starts moving along the optical axis Z1 together with the stage 31. The motor 32 stops as soon as the third lens G3 moves by a distance corresponding to the focal point correction value. In this manner, the environmental temperature is measured in advance, and the displacement of the focal point caused by the change of temperature is calculated. The focal point of the third lens G3 is corrected during the focusing operation. Thus, the displacement caused by the temperature can be corrected quickly and accurately. Accordingly, photographing can be performed in a shorter time after the photographing preparation operation is started.

In this zoom lens, the aperture stop always moves together with the second lens G2 during the zooming operation. Thus, the exit angle of an off-axis beam of light traveling toward the imaging plane Simg can be set properly while enough brightness is kept all over the zooming regions. For example, if the aperture stop is disposed near the first lens G1, the brightness will fluctuate in accordance with the zoom ratio so that it will be dark in the telephoto end. In addition, if the exit angle of an off-axis beam of light is to be kept small, the moving distance of the lens will be limited so that an enough zoom ratio cannot be obtained. On the other hand, if the aperture stop is disposed on the image side of the third lens G3 and the fourth lens G4, the exit angle of an off-axis beam of light will be too large. Thus, there will arise a problem that it will be inevitably necessary to increase the outer diameter of the first lens G1. In this embodiment, the aperture stop is provided to always abut against the surface S4 of the second lens G2 so that the zoom lens can be made compact while keeping sufficient functions as a zoom lens.

Further, in this zoom lens, the fourth lens G4 serves as an important factor to control the exit angle of an off-axis beam of light traveling toward the imaging plane Simg. That is, the fourth lens G4 is low in beam height of an axial beam of light and high in beam height of an off-axis beam of light. Accordingly, due to a change of its refracting power, the fourth lens G4 has a function of adjusting the exit angle of the off-axis beam of light without largely changing the focal length of the total system of the zoom lens.

The conditional expression (1) defines the ratio of the focal length f2 of the second lens G2 to the focal length f4 of the fourth lens G4. The conditional expression (1) expresses a condition to make miniaturization of the whole size of the total configuration compatible with proper setting of the exit angle of an off-axis beam of light traveling toward the imaging plane Simg. Here, if the ratio is lower than the lower limit of the conditional expression (1), the total lens length can be shortened, but the back-focal distance in the wide-angle end will be too short, or the exit angle of the off-axis beam of light will be too large. That is, shading in a circumferential edge portion of an imaging device will be increased to produce noise easily. Thus, it will be difficult to secure a dynamic range. On the contrary, if the ratio is higher than the upper limit of the conditional expression (1), the refracting power of the fourth lens G4 will be so high that the exit angle in the wide-angle end can be made enough small. However, the refracting power of the second lens G2 will be so low that the moving distance of the lens during the zooming operation will increase, and the back-focal distance will be elongated. Thus, it will be difficult to miniaturize the whole configuration.

The conditional expression (2) chiefly expresses a condition to keep a good chromatic aberration. When the ratio (dt−dw)/fw is set properly, the lateral color on the telephoto side is corrected more excessively than that on the wide-angle side. Thus, the shortage of correction on the telephoto side due to the first lens G1 is canceled. In addition, the back-focal distance on the telephoto side is kept proper in length, so that increase in total lens length on the telephoto side can be suppressed. Here, if the ratio is higher than the upper limit of the conditional expression (2), the back-focal distance on the telephoto side will be so small that the lateral color on the telephoto side will be excessive. Further, the difference between the distance dt in the wide-angle end and the distance dw on the telephoto end will be too large. As a result, even if the respective lens surfaces of the second and third lenses G2 and G3 are formed as aspheric surfaces, it will be difficult to correct axial chromatic aberration and lateral color all over the zoom regions in a balanced manner. On the other hand, if the ratio is lower than the lower limit of the conditional expression (2), there will arise a problem that the lateral color will be short of correction on the telephoto side. If the refracting power of the fourth lens G4 is reduced for correction in order to avoid this problem, the refracting power of the second lens G2 will have to be increased. In that case, the ratio will be consequently out of the range of the conditional expression (1). Thus, the back-focal distance in the wide-angle end will be insufficient as in Patent Document 1.

The conditional expression (3) defines the ratio of the focal length f4 of the fourth lens G4 to the focal length fw of the total system of the zoom lens in the wide-angle end. Here, if the ratio is lower than the lower limit of the conditional expression (3), the refracting power of the fourth lens G4 will be so high that the exit angle of an off-axis beam of light will be small. The adaptability of the zoom lens to the imaging device can be improved. However, in order to keep the focal length fw in the wide-angle end, the refracting power of the second lens G2 will be too low to suppress the beam height of an axial beam of light halfway. Thus, the back-focal distance will be so long that the total length will be increased. On the contrary, if the ratio is higher than the upper limit of the conditional expression (3), the back-focal distance in the wide-angle end will be too small, and the exit angle of an off-axis beam of light will be too large.

The conditional expression (4) defines a proper range of the Abbe number vd1 at the d-line in the optical material of the first lens G1. The conditional expression (4) is a condition to keep the chromatic aberration of the total system of the zoom lens good. The Abbe number vd1 conspicuously shows a difference from an objective lens in a real image system zoom finder. The zoom lens according to this embodiment is designed so that each lens can move independently. It is therefore important to suppress fluctuation of chromatic aberration especially. When the conditional expression (4) is satisfied, axial chromatic aberration and lateral color can be corrected well. If the Abbe number vd1 is lower than the lower limit of the conditional expression (4), the lateral color will increase in the wide-angle end, and the axial chromatic aberration will increase in the telephoto end.

In this manner, in the zoom lens according to this embodiment, the first to fourth lenses G1 to G4 are arranged thus, and further designed to satisfy all the conditional expressions (1) to (4). Accordingly, the zoom lens can be made compact, and high imaging performance can be secured.

Particularly when each of the first and second lenses G1 and G2 is made of an organic material, both the reduction in weight and the suppression of fluctuation of the focal point caused by a change in environmental temperature can be made compatible. In this case, when the third lens G3 is also made of an organic material, the fluctuation of the focal point caused by a change in temperature can be corrected more easily and more simply.

As in the second configuration example (FIGS. 2A-2C), the fourth lens G4 may be fixed during zooming and during focusing so as to keep the back-focal distance constant. In this case, it will go well if only the first to third lenses G1 to G3 are set as movable groups. It is therefore possible to simplify the mechanical structure. When the fourth lens G4 is moved as a focusing group, the zooming mechanism and the focusing mechanism may be separated mechanically.

As in the third configuration example (FIGS. 3A-3C), the mutual distance between the first lens G1 and the fourth lens G4 may be kept constant at the time of a zooming operation. In this case, the number of movable groups is substantially three, that is, the first lens G1 together with the fourth lens G4, the second lens G2 and the third lens G3. It is therefore possible to simplify the mechanical structure.

As in the fourth configuration example (FIGS. 4A-4C), the zooming operation may be performed while keeping the distance between the first lens G1 and the imaging plane Simg constant. This case is advantageous to make the whole configuration compact.

Next, description will be made about specific numerical examples of imaging lenses according to this embodiment.

First to fourth numerical examples (Examples 1 to 4) will be described collectively below. Here, FIGS. 7 to 10 show specific fundamental lens data (Examples 1 to 4) corresponding to zoom lenses as the first to fourth configuration examples shown in FIGS. 1A-1C to 4A-4C, respectively. Further, FIGS. 11 to 14 show data about aspheric shapes corresponding to the zoom lenses as the first to fourth configuration examples, respectively.

In the field of a surface number Si in the fundamental lens data shown in FIGS. 7 to 10, the number of an i-th (i=1 to 11) surface is shown on the assumption that the first surface is a surface of a constituent element located nearest to the object side of all including the aperture stop St and the cover glass GC, and the suffix i is given to increase sequentially as the i-th surface Si is nearer to the image side, correspondingly to the reference sign Si shown in FIGS. 1A-1C to 4A-4C. In the field of a curvature radius Ri, a value of the curvature radius of the i-th surface from the object side is shown correspondingly to the reference sign Ri shown in FIGS. 1A-1C to 4A-4C. In the field of a surface-to-surface distance Di, the distance along the optical axis between the i-th surface Si and the (i+1)-th surface Si+1 from the object side is shown correspondingly to the reference sign Di shown in FIGS. 1A-1C to 4A-4C. The values of the curvature radius Ri and the surface-to-surface distance Di are expressed by units of millimeters (mm). In the fields of Ndj and vdj, values of a refractive index and an Abbe number at the d-line (587.6 nm) in a j-th (j=1 to 5) lens element of all including the cover glass GC from the object side are shown respectively. The values of curvature radii R10 and R11 of the opposite surfaces of the cover glass GC are zero. This means those surfaces are flat. The cover glass GC is usually fixed in a predetermined position with respect to the imaging plane Simg. Here, the cover glass GC is designed to move together with the fourth lens G4 for the sake of simplicity.

In FIGS. 7 to 10, the mark "*" on the left side of the surface number Si designates the corresponding lens surface has an aspherical shape. In each example, the opposite surfaces S1 to S4 of the first lens G1 and the second lens G2 are formed into aspheric shapes. In the fundamental lens data, numeric values of curvature radii near the optical axis (near the paraxial axis) are shown as the curvature radii of these aspheric surfaces.

In each numeric value of the aspheric data in FIGS. 11 to 14, the sign "E" designates the numeric value following the sign "E" is an "exponent" in base 10, and the numeric value followed by the sign "E" is multiplied by the numeric value expressed by an exponential function in base 10. For example, "1.0E-02" designates "$1.0 \times 10^{-2}$".

The aspheric data include values of coefficients Ai and K in an equation of an aspheric surface shape expressed by the following equation (ASP). In more detail, Z designates the length (mm) of a perpendicular line dropped on a tangent plane (a plane perpendicular to the optical axis) of a summit of an aspheric surface from a point on the aspheric surface located at height h from the optical axis.

$$Z = C \cdot h^2 / \{1 + (1 - K \cdot C^2 \cdot h^2)^{1/2}\} + \Sigma(A_n \cdot h^n) \quad \text{(ASP)}$$

where:
- Z: depth (mm) of aspheric surface
- h: distance (height) (mm) from optical axis-to lens surface
- K: eccentricity
- C: paraxial curvature=1/R
- (R: paraxial curvature radius)
- $A_n$: n-order (n=3 to 16) aspheric coefficient In Example 1, as shown in FIG. 11, the aspheric shapes of the opposite surfaces of the first lens G1 use not only even-order aspheric coefficients $A_4$, $A_6$, $A_8$ and $A_{10}$ but also odd-order aspheric coefficients $A_3$, $A_5$, $A_7$ and $A_9$ effectively as aspheric coefficients.

Each zoom lens according to Examples 1 to 4 is designed so that mutual distances among the first to fourth lenses G1 to G4 vary in accordance with a zooming operation. To this end, the values of surface-to-surface distances D2, D5, D7 and D11 are variable. However, only in Example 2, the fourth lens G4 is not movable, but the surface-to-surface distance D11 is fixed. In each example, the surface-to-surface distance between the fourth lens G4 and the cover glass GC is constant. FIGS. 15-18 show values of the surface-to-surface distances D2, D5, D7 and D11 in the wide-angle end, the intermediate stage and the telephoto end in each example. FIGS. 15-18 also show the values of the focal length of the total system, the back-focal distance (on an air basis), the F-number (FNO.) and the view angle 2ω in the wide-angle end, the intermediate stage and the telephoto end. The focal length of the total system and the back-focal distance (on an air basis) are expressed by units of millimeters (mm).

FIG. 19 collectively shows values corresponding to the aforementioned conditional expressions (1) to (4) in the respective examples. As shown in FIG. 19, all the values in each example fall within the numerical ranges of the conditional expressions (1) to (4).

FIGS. 20-23 collectively show data about temperature compensation in each example. FIGS. 20-23 show a focus value (mm) at distance 0.2 m to an object, a focus displacement A (mm) at a temperature rise of 30° C., a focus displacement sensitivity B, and a correction value –A/B (mm) at a temperature rise of 30° C. in the wide-angle end and the telephoto end. The focus value at distance 0.2 m to an object is a movement of a focus group (that is, third lens G3) required for focusing on the object at a distance of 0.2 m in the state where the focus group has focused on an object at infinity. In each example, the third lens G3 is set as a focusing group so that the movement can be made comparatively small. The "focus displacement at a temperature rise of 30° C." shows a displacement of the focal point (along the optical axis from the reference position) when the environmental temperature rises by 30° C. The "focus displacement sensitivity" is defined as the ratio of the displacement of the focal point to the displacement of the focusing group along the optical axis. Therefore, the displacement of the focusing group for focusing may be smaller as the focus displacement sensitivity is smaller. When the third lens G3 is set as a focusing group in each example, the focus displacement sensitivity can be reduced to a minimum. The "correction value at a temperature rise of 30° C." is a movement of the third lens G3 required for correcting the focal point displacement when the environmental temperature rises by 30° C. The "correction value at a temperature rise of 30° C." is obtained by the ratio of the "focus displacement at a temperature rise of 30° C." to the focus displacement sensitivity". In FIGS. 20-23, the direction to move from the object side to the image side is regarded as positive in each numeric value.

FIGS. 24A-24D show spherical aberration, field curvature, distortional aberration, and lateral color in the wide-angle end in the zoom lens of Example 1 respectively. FIGS. 25A-25D show similar aberrations in the intermediate state likewise. FIGS. 26A-26D show similar aberrations in the telephoto end likewise. Each aberration diagram shows aberration at the d-line as reference wavelength. The spherical aberration diagram and the field curvature diagram also show aberrations at the g-line (wavelength 435.8 nm) and the C-line (wavelength 656.3 nm). In the field curvature diagram, the solid line shows aberration in a sagittal direction, and the broken line shows aberration in a tangential direction. FNO. designates an F-number, and H designates image height.

Similarly, FIGS. 27A-27D show various aberrations in the wide-angle end in Example 2, FIGS. 28A-28D show various aberrations in the intermediate state likewise, and FIGS. 29A-29D show various aberrations in the telephoto end likewise. FIGS. 30A-30D show various aberrations in the wide-angle end in Example 3, FIGS. 31A-31D show various aberrations in the intermediate state likewise, and FIGS. 32A-32D show various aberrations in the telephoto end likewise. FIGS. 33A-33D show various aberrations in the wide-angle end in Example 4, FIGS. 34A-34D show various aberrations in the intermediate state likewise, and FIGS. 35A-35D show various aberrations in the telephoto end likewise.

As is apparent from the lens data and the aberration diagrams described above, each example shows extremely excellent aberration performance. In addition, the total length of each zoom lens can be made compact.

Figures 36, 37:
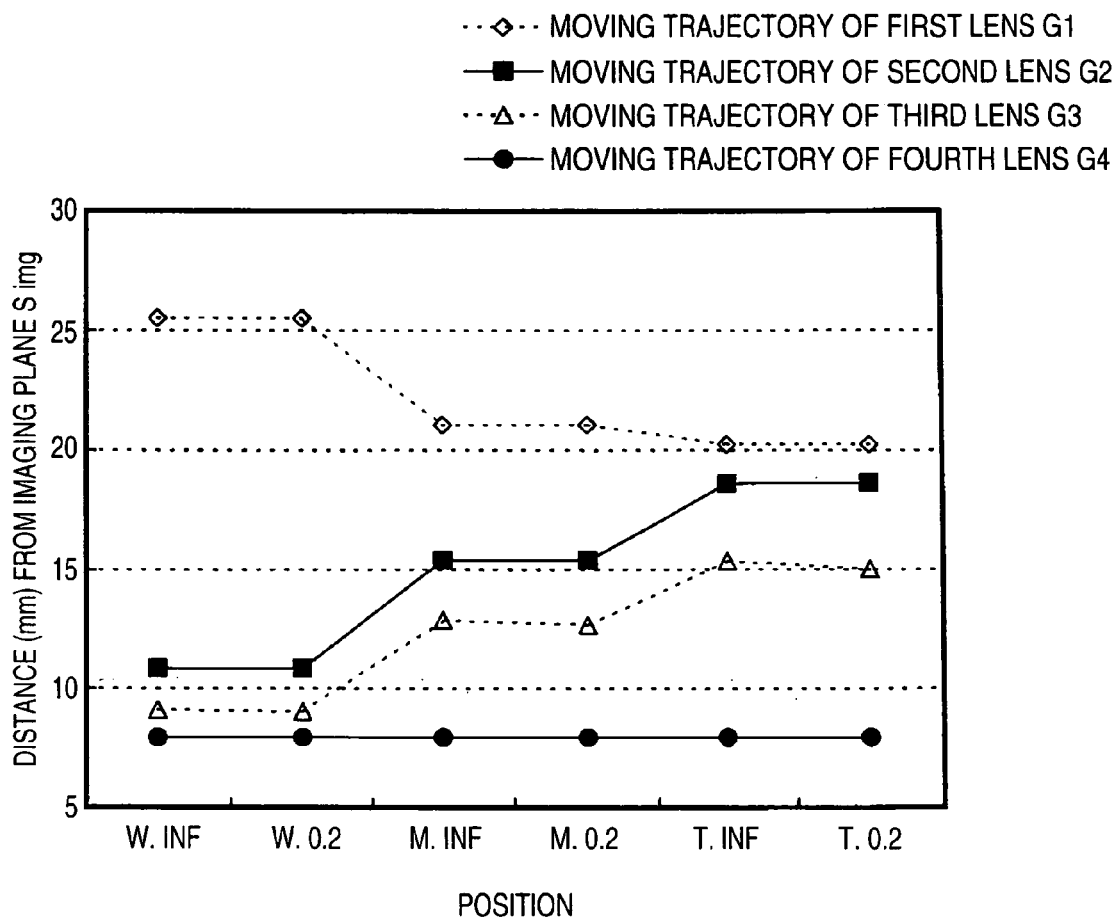
FIG. 36 is an explanatory diagram showing a moving trajectory of each lens from the wide-angle end to the telephoto end in the zoom lens of Example 2.
FIG. 37 is a table showing numeric data corresponding to FIG. 36.

FIG. 36 shows a moving trajectory of each lens from the wide-angle end to the telephoto end in the zoom lens of Example 2. The ordinate designates a distance (mm) between the position of the imaging plane Simg and each lens. The abscissa designates the position of each lens. Specifically, W.INF designates a position in the wide-angle end when the distance to an object is at infinity, and W.0.2 designates a position in the wide-angle end when the distance to an object is closest (0.2 m). Similarly, M.INF designates a position in an intermediate stage when the distance to an object is at infinity, and M.0.2 designates a position in the intermediate stage when the distance to an object is closest (0.2 m). Similarly, T.INF designates a position in the telephoto end when the distance to an object is at infinity, and T.0.2 designates a position in the telephoto end when the distance to an object is closest (0.2 m). FIG.

Figures 38, 39:
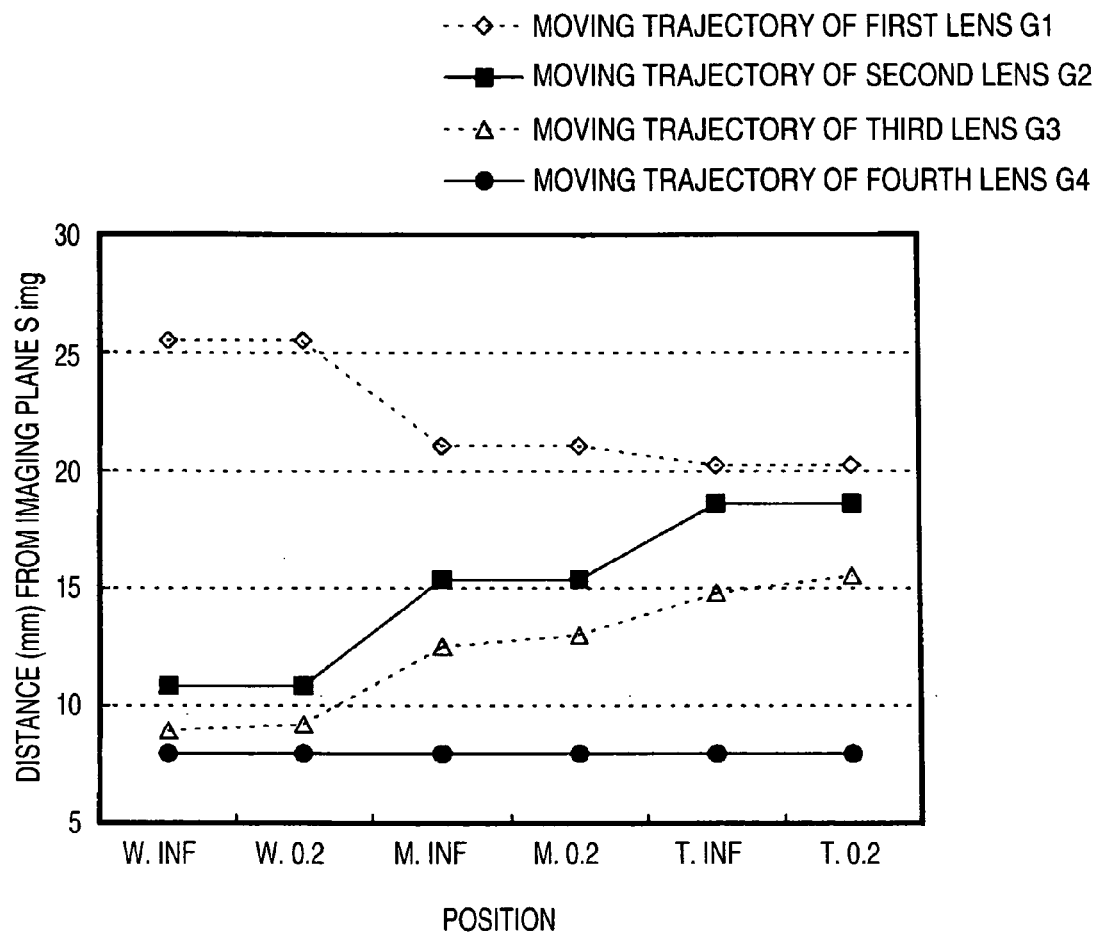
FIG. 38 is an explanatory diagram showing a moving trajectory of each lens from the wide-angle end to the telephoto end in the zoom lens of Example 2 when temperature compensation is carried out.
FIG. 39 is a table showing numeric data corresponding to FIG. 38.

37 shows numeric data corresponding to FIG. 36. Further, FIG. 38 shows a moving trajectory of each lens from the wide-angle end to the telephoto end when temperature compensation is performed in consideration of the focal point displacement caused by the change of environmental temperature. FIG. 39 shows numeric data corresponding to FIG. 38. Here, the moving distance of the third lens G3 is corrected.

The invention has been described above along its embodiment and examples. The invention is not limited to the aforementioned embodiment and the aforementioned examples, but various modifications can be made thereon. For example, the values of the curvature radius, the surface-to-surface distance and the refractive index of each lens element are not limited to those shown in any numerical example. They can take other values.

Figure 40:
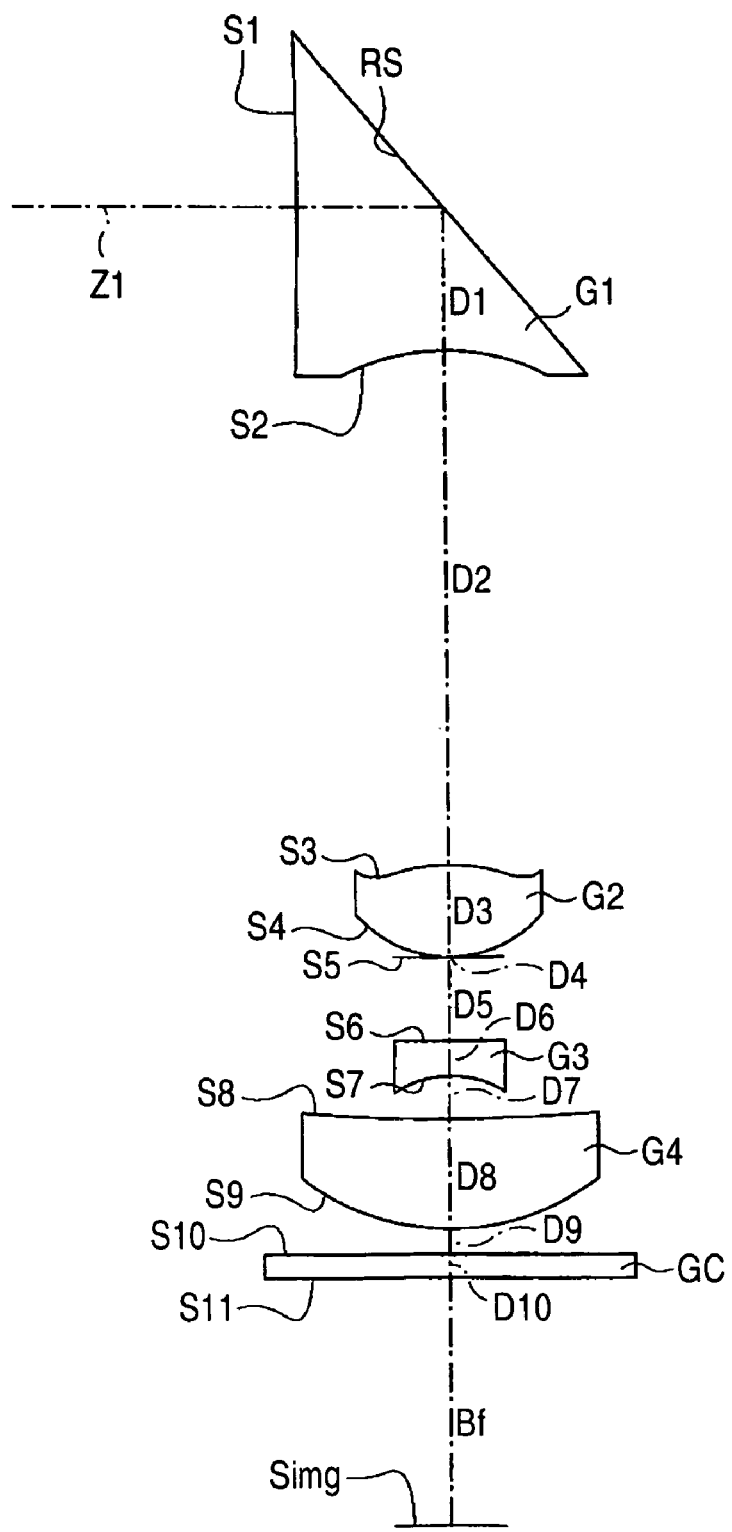
FIG. 40 is a sectional view in a modification of the zoom lens shown in FIG. 4.

The zoom lens may have a configuration where a reflecting surface forming a bending optical system is disposed in or near the first lens. FIG. 40 shows a modification of the zoom lens shown in FIGS. 4A to 4C. In FIG. 40, a right-angle prism lens having a reflecting surface RS is used as the first lens G1. In this manner, it is possible to arrange a bending-system zoom lens whose optical axis is bent by the reflecting surface RS. Thus, the zoom lens can be made low in profile as a whole. In place of the right-angle prism lens, a mirror where a reflecting surface is formed on a flat plate may be disposed near (object side or image side) the first lens. Also in such a modification, it is preferable that both the first lens G1 and the second lens G2 are made of organic materials.

In the aforementioned embodiment and examples, the focal point displacement caused by the change of environmental temperature is corrected. In addition thereto, it is more preferable to correct the focal point displacement caused by the change of humidity. In this case, for example, a humidity sensing portion is further provided in the focus compensation mechanism 40 shown in FIG. 5, and humidity information is inputted to the control portion 20.

In the aforementioned embodiment and examples, the aperture stop is disposed in the image-side surface position of the second lens. However, the invention is not limited to this. It will go well if the aperture stop is disposed between the second lens and the third lens.

While the invention has been described with reference to the exemplary embodiments, the technical scope of the invention is not restricted to the description of the exemplary embodiments. It is apparent to the skilled in the art that various changes or improvements can be made. It is apparent from the description of claims that the changed or improved configurations can also be included in the technical scope of the invention.

The present application claims foreign priority based on Japanese Patent Application Nos. JP2005-328566 and JP2005-364891, filed Nov. 14 and Dec. 19 of 2005, respectively, the contents of which is incorporated herein by reference.

What is claimed is:

1. A zoom lens comprising: a first lens of a negative lens; a second lens of a positive lens; an aperture stop; a third lens of a negative lens; and a fourth lens of a positive lens in this order from an object side of the zoom lens, wherein a zooming operation of the zoom lens is performed by varying mutual distances among the first to fourth lenses, and the zoom lens satisfies conditional expressions (1) to (4):

$$0.35 < f2/f4 < 0.70 \quad (1)$$

$$0.04 < (dt-dw)/fw < 0.40 \quad (2)$$

$$1.65 < f4/fw < 2.20 \quad (3)$$

$$50 < vd1 \quad (4)$$

wherein f2 designates a focal length of the second lens;

f4 designates a focal length of the fourth lens;

dt designates a distance along an optical axis between the second lens and the third lens in a wide-angle end of the zoom lens;

dw designates a distance along the optical axis between the second lens and the third lens in a telephoto end of the zoom lens;

fw designates a focal length of a total system of the zoom lens in the telephoto end; and vd1 designates an Abbe number of the first lens at the d-line.

2. The zoom lens according to claim 1, wherein the zooming operation is performed by moving at least the second lens and the third lens along the optical axis.

3. The zoom lens according to claim 1, wherein a distance between the fourth lens and an imaging plane is kept constant at least in the zooming operation.

4. The zoom lens according to claim 1, wherein the zooming operation is performed by moving the first lens and the fourth lens jointly along the optical axis.

5. The zoom lens according to claim 1, wherein a distance between the first lens and an imaging plane is kept constant.

6. The zoom lens according to claim 1, wherein a focusing operation of the zoom lens is performed by moving the third lens along the optical axis.

7. The zoom lens according to claim 1, wherein at least the first lens and the second lens each are made of an organic material.

8. The zoom lens according to claim 1, further comprising:

a temperature sensing portion that measures an environmental temperature;

a control portion that calculates a correction value of a focal point of the zoom lens based on the environmental temperature and outputs a control signal on the correction value of the focal point; and a driving portion that makes at least one of the first to fourth lenses move by a distance corresponding to the correction value of the zoom lens in response to the control signal.

9. The zoom lens according to claim 1, wherein the zoom operation and the focusing operation are performed alternately by continuously moving at least the third lens along the optical axis.

10. A zoom lens according to claim 1, wherein a reflection surface forming a bending optical system is provided in or near the first lens.

* * * * *